United States Patent
Hisatake

(10) Patent No.: US 7,502,091 B2
(45) Date of Patent: Mar. 10, 2009

(54) OPTICAL SHEET, ELECTRIC-FIELD-CONTROLLED PANEL, LIGHTING APPARATUS, LIQUID CRYSTAL DISPLAY, AND METHOD OF MANUFACTURING AN OPTICAL SHEET

(75) Inventor: Yuuzo Hisatake, Fukaya (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 394 days.

(21) Appl. No.: 11/461,570

(22) Filed: Aug. 1, 2006

(65) Prior Publication Data
US 2007/0030427 A1 Feb. 8, 2007

(30) Foreign Application Priority Data

Aug. 5, 2005 (JP) .............................. 2005-228378
Aug. 5, 2005 (JP) .............................. 2005-228379

(51) Int. Cl.
*G02F 1/1333* (2006.01)
(52) U.S. Cl. ....................................... 349/160; 349/158
(58) Field of Classification Search .................. 349/158, 349/160
See application file for complete search history.

(56) References Cited

U.S. PATENT DOCUMENTS
6,801,278 B2 * 10/2004 Tanada et al. ................ 349/113

FOREIGN PATENT DOCUMENTS
JP 2003-58066 2/2003

* cited by examiner

*Primary Examiner*—David Nelms
*Assistant Examiner*—Phu Vu
(74) *Attorney, Agent, or Firm*—Oblon, Spivak, McClelland, Maier & Neustadt, P.C.

(57) ABSTRACT

An optical sheet has an isotropic medium layer and an anisotropic medium layer. The isotropic medium layer is made of an optically isotropic medium and has a first surface and ridge-shaped projections. The projections are formed on the first surface, arranged in a first direction and extend in a second direction intersecting at right angles to the first direction. Each projection has a cross section shaped like a segment of a circle. The anisotropic medium layer is made of an optically uniaxial medium and has a second surface and groove-shaped recesses. The recesses are made in the second surface, arranged in the first direction and extend in the second direction. Each recesses has a cross section shaped like a segment of a circle. The isotropic and the anisotropic medium layers are laid one on the other, with the respective projections firmly fitted in the respective recesses.

31 Claims, 10 Drawing Sheets

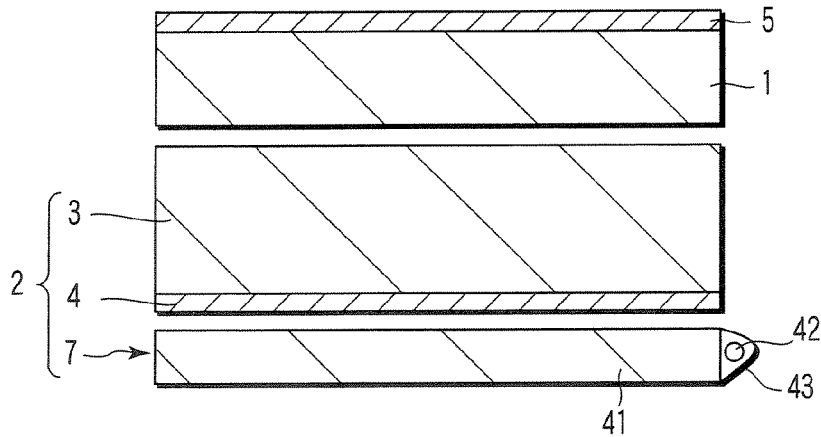
F I G. 3
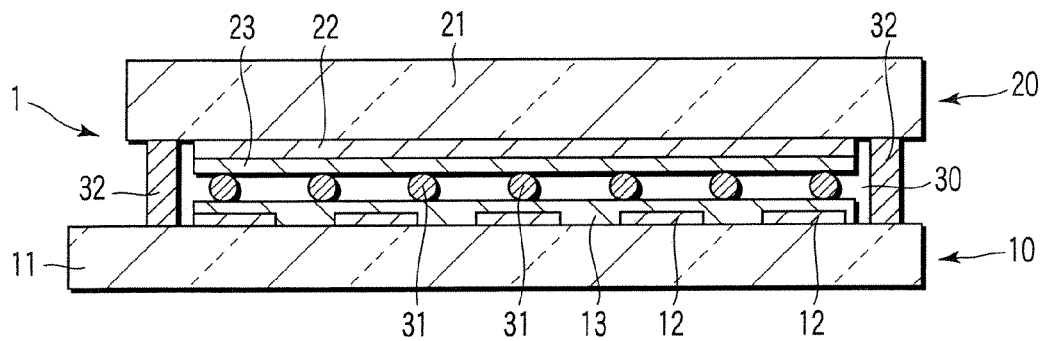
F I G. 4
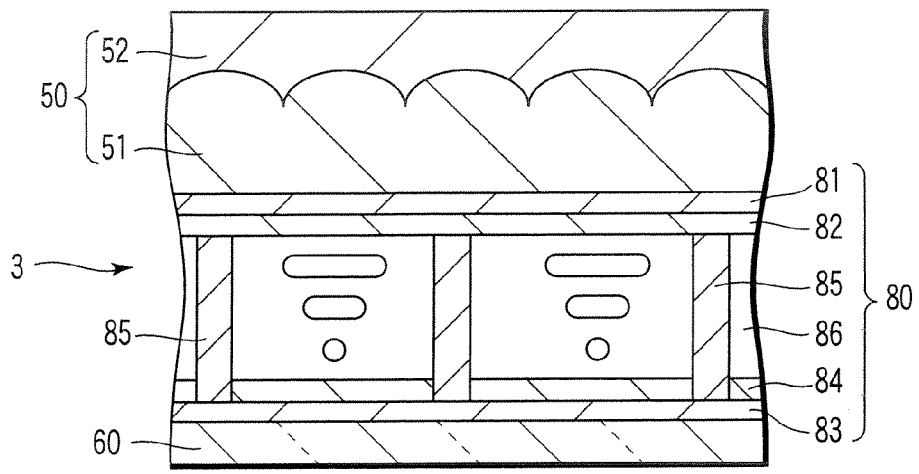
F I G. 5

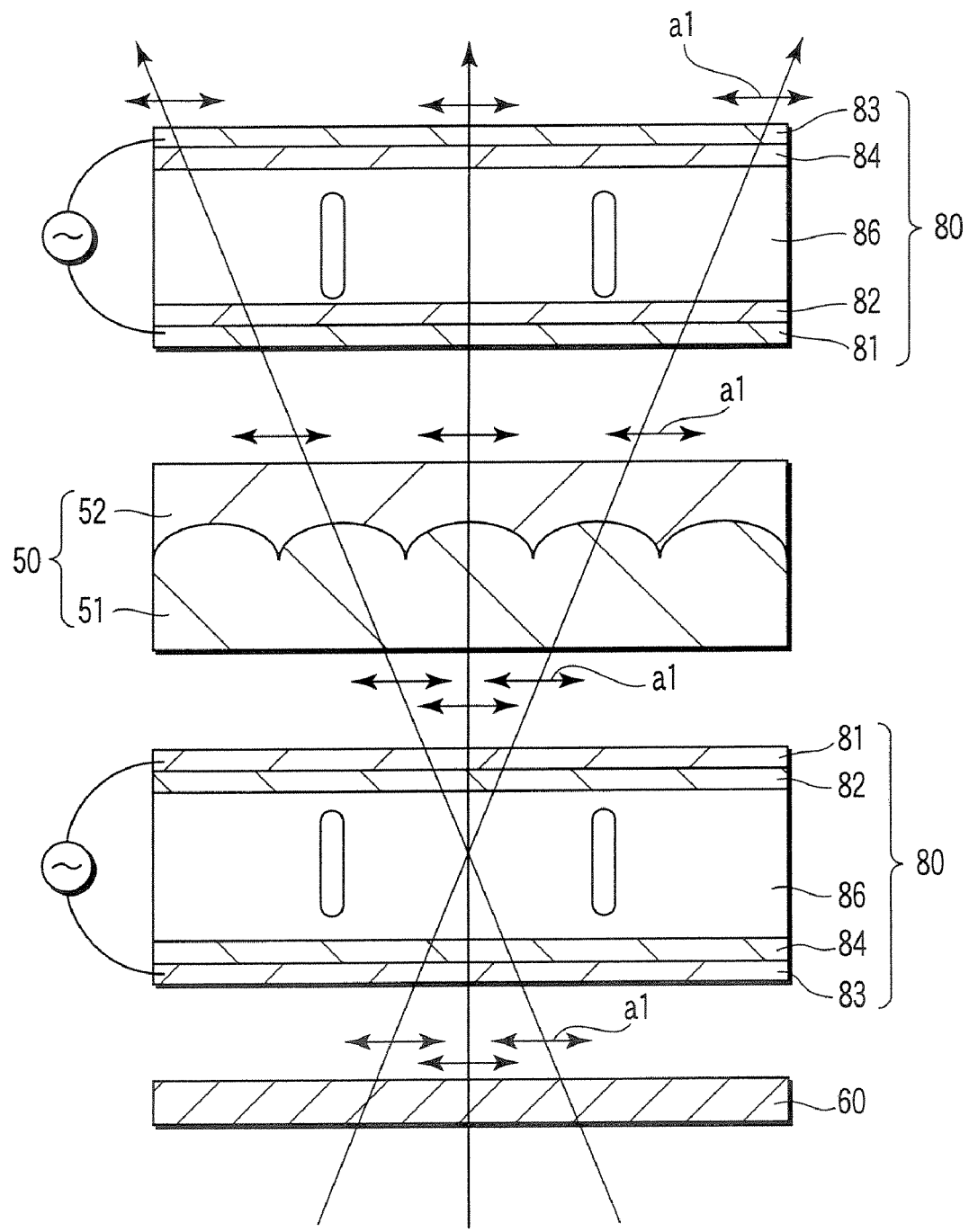
F I G. 11

OPTICAL SHEET, ELECTRIC-FIELD-CONTROLLED PANEL, LIGHTING APPARATUS, LIQUID CRYSTAL DISPLAY, AND METHOD OF MANUFACTURING AN OPTICAL SHEET

CROSS-REFERENCE TO RELATED APPLICATIONS

This application is based upon and claims the benefit of priority from prior Japanese Patent Applications No. 2005-228378, filed Aug. 5, 2005; and No. 2005-228379, filed Aug. 5, 2005, the entire contents of both of which are incorporated herein by reference.

BACKGROUND OF THE INVENTION

1. Field of the Invention

The present invention relates to an optical sheet, an electric-field-controlled panel having an optical sheet, a lighting apparatus having an electric-field-controlled panel, a liquid crystal display having a lighting apparatus, and a method of manufacturing an optical sheet.

2. Description of the Related Art

In recent years, liquid crystal displays have come into use in various products such as notebook personal computers (PCs), monitors, car navigation systems, function calculators, small- and medium-size TV sets, large-size TV sets, cellular telephones, electronic pocket diaries, personal digital assistants (PDAs), and the like. Of these products, electronic pocket diaries, PDAs, cellular telephones, tablet PCs, and notebook PCs are frequently used, because the liquid crystal displays mounted on them are small, thin and light. Further, liquid crystal displays are widely used at points-of-purchases (POPs) apparatuses and automated teller machines (ATMs). Still further, liquid crystal displays are used in public-service apparatuses such as ticket machines.

In some cases, the information displayed on any product mentioned above should be concealed from people other than the user of the product. For example, a cellular telephone, a PDA or a tablet PC may display private information while used in public. In this case, the display on the apparatus should better have a small angle of visibility. However, two or more people need to observe the information in some cases. In view of this, the angle of visibility should be controlled and portable apparatuses and public-use information terminals should have a function of controlling the angle of visibility.

In recent years, a removable louver sheet has been used as means for controlling the angle of visibility of the liquid crystal display or the cathode-ray tube (CRT), as is disclosed in, for example, Jpn. Pat. Appln. KOKAI Publication No. 2003-58066. Further, a system has been put to practical use, in which the liquid crystal display used has no polarizing plates on the front. The user can observe the information only if he or she wears polarizing glasses.

The conventional louver sheet has a light-shielding layer that is several millimeters thick in the direction normal to the sheet, in order to reduce the angle of visibility as much as possible. Any liquid crystal display that uses the conventional louver sheet inevitably has low transmittance and, hence, low luminance. Further, the method of manufacturing the louver sheet is complicated, increasing the manufacturing cost of the louver sheet. Still further, it takes much time and labor to attach and removed the louver sheet to and from the liquid crystal display. With the system wherein the user wears the polarizing glasses, any person other than the user cannot see the information at all.

BRIEF SUMMARY OF THE INVENTION

This invention has been made in view of the foregoing. An object of the invention is to provide an optical sheet that can be so controlled to the direction in which light travels. Further, the invention relates to an electric-field-controlled panel having such an optical sheet, a lighting apparatus having such an electric-field-controlled panel, a liquid crystal display having such a lighting apparatus, and a method of manufacturing such an optical sheet.

To achieve the object, according to an aspect of the present invention, there is provided an optical sheet comprising:

an isotropic medium layer which is made of an optically isotropic medium and which has a first surface, a plurality of ridge-shaped projections formed on the first surface, arranged in a first direction and extending in a second direction intersecting at right angles to the first direction, and a third surface being smooth and opposed to the first surface, each of the projections having a cross section shaped like a segment of a circle; and an anisotropic medium layer which is made of an optically uniaxial medium and which has a second surface, and a plurality of groove-shaped recesses made in the second surface, arranged in the first direction and extending in the second direction, and a fourth surface being smooth and opposed to the second surface, each of the recesses having a cross section shaped like a segment of a circle;

the isotropic medium layer and the anisotropic medium layer being laid one on the other, with the respective projections firmly fitted in the respective recesses, and the isotropic medium layer having a refractive index equal to a refractive index of the anisotropic medium layer in the first direction.

According to another aspect of the invention, there is provided an optical sheet comprising:

an isotropic medium layer which is made of an optically isotropic medium and which has a first surface, a plurality of ridge-shaped projections formed on the first surface, and a third surface being smooth and opposed to the first surface, each of the projections having a substantially triangular cross section; and an anisotropic medium layer which is made of an optically uniaxial medium and which has a second surface, a plurality of groove-shaped recesses made in the second surface, and a fourth surface being smooth and opposed to the second surface, each of the recesses having a substantially triangular cross section;

the projections and the recesses being arranged in a first direction and extending in a second direction, the cross section of each of the projections having a substantially right-angled apex defined by two sides which have substantially the same length and which extend from the first surface, and the cross section of each of the recesses having a substantially right-angled apex defined by two sides which have substantially the same length and which recede from the second surface, the first and second directions being in planes of the isotropic and anisotropic medium layers and intersecting with each other at right angles, the isotropic medium layer and the anisotropic medium layer being laid one on the other, with the respective projections firmly fitted in the respective recesses, the isotropic medium layer having a refractive index equal to a refractive index which the anisotropic medium layer has with respect to the first direction, and the optical sheet being configured to receive light polarized in the first direction, maintain the light polarized in the first direction, diffuse the light and emit the light diffused, and to receive light polarized in the second direction, maintain the light polarized in the second direction, collimate the light in a direction normal to the optical sheet and emit the light.

According to another aspect of the invention, there is provided an electric-field-controlled panel comprising:

an optical sheet which has an isotropic medium layer and an anisotropic medium layer, the isotropic medium layer being made of an optically isotropic medium and having a first surface and a plurality of ridge-shaped projections which are formed on the first surface, which are arranged in a first direction and which extend in a second direction intersecting at right angles to the first direction, each of the projections having a cross section shaped like a segment of a circle, the anisotropic medium layer being made of an optically uniaxial medium and having a second surface and a plurality of groove-shaped recesses which are made in the second surface, which are arranged in the first direction and which extend in the second direction, each of the recesses having a cross section shaped like a segment of a circle, and the isotropic medium layer and the anisotropic medium layer being laid one on the other, with the respective projections firmly fitted in the respective recesses; and a liquid crystal display element which has a first transparent electrode facing the optical sheet and located at the isotropic medium layer, a first alignment film formed on the first transparent electrode, a second transparent electrode, and a second alignment film formed on the second transparent electrode, and a liquid crystal layer interposed between the first and second alignment films, the liquid crystal element being configured to receive polarized light and emit the light as light polarized in the first direction while a voltage is being applied between the first transparent electrode and the second transparent electrode, and to receive polarized light and emit the light as light polarized in the second direction while no voltage is being applied between the first transparent electrode and the second transparent electrode, and the optical sheet being configured to receive, from the liquid crystal element, light polarized in the first direction, maintain the light polarized in the first direction, diffuse the light and emit the light diffused, and to receive, from the liquid crystal element, light polarized in the second direction, maintain the light polarized in the second direction, collimate the light in a direction normal to the optical sheet and emit the light.

According to another aspect of the invention, there is provided an electric-field-controlled panel comprising:

an optical sheet having an isotropic medium layer which is made of an optically isotropic medium and which has a first surface and a plurality of ridge-shaped projections formed on the first surface, each of the projections having a substantially triangular cross section; and an anisotropic medium layer which is made of an optically uniaxial medium and which has a second surface and a plurality of groove-shaped recesses made in the second surface, each of the recesses having a substantially triangular cross section, the projections and the recesses being arranged in a first direction and extending in a second direction, the first and second directions being in planes of the isotropic and anisotropic medium layers and intersecting with each other at right angles, the cross section of each of the projections having a substantially right-angled apex defined by two sides which have substantially the same length and which extend from the first surface, and the cross section of each of the recesses having a substantially right-angled apex defined by two sides which have substantially the same length and which recede from the second surface, and the isotropic medium layer and the anisotropic medium layer being laid one on the other, with the respective projections firmly fitted in the respective recesses; and a liquid crystal display element which has a first transparent electrode facing the optical sheet and located at the isotropic medium layer, a first alignment film formed on the first transparent electrode, a second transparent electrode, and a second alignment film formed on the second transparent electrode, and a liquid crystal layer interposed between the first and second alignment films, the liquid crystal element being configured to receive polarized light and emit the light as light polarized in the first direction while a voltage is being applied between the first transparent electrode and the second transparent electrode, and to receive polarized light and emit the light as light polarized in the second direction while no voltage is being applied between the first transparent electrode and the second transparent electrode, and the optical sheet being configured to receive, from the liquid crystal element, light polarized in the first direction, maintain the light polarized in the first direction, diffuse the light and emit the light diffused, and to receive, from the liquid crystal element, light polarized in the second direction, maintain the light polarized in the second direction, collimate the light in a direction normal to the optical sheet and emit the light.

According to another aspect of the invention, there is provided a lighting apparatus comprising:

an optical sheet which has an isotropic medium layer and an anisotropic medium layer, the isotropic medium layer being made of an optically isotropic medium and having a first surface and a plurality of ridge-shaped projections which are formed on the first surface, which are arranged in a first direction and which extend in a second direction intersecting at right angles to the first direction, each of the projections having a cross section shaped like a segment of a circle; the anisotropic medium layer being made of an optically uniaxial medium and having a second surface and a plurality of groove-shaped recesses which are made in the second surface, which are arranged in the first direction and which extend in the second direction, each of the recesses having a cross section shaped like a segment of a circle, and the isotropic medium layer and the anisotropic medium layer being laid one on the other, with the respective projections firmly fitted in the respective recesses;

a liquid crystal element which faces the optical sheet and which is located at the isotropic medium layer;

a backlight unit which faces the liquid crystal element; and a polarizer which is interposed between the liquid crystal element and the backlight unit, the backlight unit being configured to emit diffused light, the polarizer having a transmission axis that is parallel to the first direction, the liquid crystal element being configured to receive light polarized in the first direction and emits the light as light polarized in the first direction or the second direction, and the optical sheet being configured to receive, from the liquid crystal element, light polarized in the first direction, maintain the light polarized in the first direction, diffuse the light and emit the light diffused, and to receive, from the liquid crystal element, light polarized in the second direction, maintain the light polarized in the second direction, collimate the light in a direction normal to the optical sheet and emit the light.

According to another aspect of the invention, there is provided a lighting apparatus comprising:

an optical sheet having an isotropic medium layer which is made of an optically isotropic medium and which has a first surface and a plurality of ridge-shaped projections formed on the first surface, each of the projections having a substantially triangular cross section; and an anisotropic medium layer which is made of an optically uniaxial medium and which has a second surface and a plurality of groove-shaped recesses made in the second surface, each of the recesses having a substantially triangular cross section, the projections and the recesses being arranged in a first direction and extending in a second direction, the first and second directions being in planes of the isotropic and anisotropic medium layers and intersecting with each other at right angles, the cross section of each of the projections having a substantially right-angled apex defined by two sides which have substantially the same length and which extend from the first surface, and the cross section of each of the recesses having a substantially right-angled apex defined by two sides which have substantially the same length and which recede from the second surface, and the isotropic medium layer and the anisotropic medium layer being laid one on the other, with the respective projections firmly fitted in the respective recesses;

a liquid crystal element which faces the optical sheet and which is located at the isotropic medium layer;

a backlight unit which faces the liquid crystal element; and a polarizer which is interposed between the liquid crystal element and the backlight unit, the backlight unit being configured to emit diffused light, the polarizer having a transmission axis that is parallel to the first direction, the liquid crystal element being configured to receive light polarized in the first direction and emits the light as light polarized in the first direction or the second direction, and the optical sheet being configured to receive, from the liquid crystal element, light polarized in the first direction, maintain the light polarized in the first direction, diffuse the light and emit the light diffused, and to receive, from the liquid crystal element, light polarized in the second direction, maintain the light polarized in the second direction, collimate the light in a direction normal to the optical sheet and emit the light.

According to another aspect of the invention, there is provided a liquid crystal display comprising:

a lighting apparatus which includes an optical sheet, a liquid crystal element and a back light unit, the optical sheet having an isotropic medium layer and an anisotropic medium layer, the isotropic medium layer being made of an optically isotropic medium and having a first surface, a plurality of ridge-shaped projections which are formed on the first surface, which are arranged in a first direction and which extend in a second direction intersecting at right angles to the first direction, each of the projections having a cross section shaped like a segment of a circle, the anisotropic medium layer being made of an optically uniaxial medium and having a second surface, and a plurality of groove-shaped recesses which are made in the second surface, which are arranged in the first direction and extend in the second direction, each of the recesses having a cross section shaped like a segment of a circle, and the isotropic medium layer and the anisotropic medium layer being laid one on the other, with the respective projections firmly fitted in the respective recesses; the liquid crystal element facing the optical sheet and located at the isotropic medium layer; and the backlight unit facing the liquid crystal element;

a liquid crystal display panel which includes an array substrate, a counter substrate arranged opposite to the array substrate with a gap therebetween, and a liquid crystal layer interposed between the array substrate and the counter substrate; and a polarizer which is interposed between the liquid crystal element and the backlight unit, the array substrate and the optical sheet being opposed to each other, the polarizer having a transmission axis that is parallel to the first direction, the liquid crystal element being configured to receive light polarized in the first direction and emits the light as light polarized in the first direction or the second direction, and the optical sheet being configured to receive, from the liquid crystal element, light polarized in the first direction, maintain the light polarized in the first direction, diffuse the light and emit the light diffused, and to receive, from the liquid crystal element, light polarized in the second direction, maintain the light polarized in the second direction, collimate the light in a direction normal to the optical sheet and emit the light.

According to another aspect of the invention, there is provided a liquid crystal display comprising:

a lighting apparatus which includes an optical sheet, a liquid crystal element and a back light unit, the optical sheet having an isotropic medium layer which is made of an optically isotropic medium and which has a first surface and a plurality of ridge-shaped projections formed on the first surface, arranged in a first direction and extending in a second direction, each of the projections having a substantially triangular cross section, and an anisotropic medium layer which is made of an optically uniaxial medium and which has a second surface, a plurality of groove-shaped recesses made in the second surface, arranged in the first direction and extending in the second direction, each of the recesses having a substantially triangular cross section, the first and second directions being in planes of the isotropic and anisotropic medium layers and intersecting with each other at right angles, the cross section of each of the projections having a substantially right-angled apex defined by two sides which have substantially the same length and which extend from the first surface, and the cross section of each of the recesses having a substantially right-angled apex defined by two sides which have substantially the same length and which recede from the second surface, and the isotropic medium layer and the anisotropic medium layer being laid one on the other, with the respective projections firmly fitted in the respective recesses; the liquid crystal element facing the optical sheet and located at the isotropic medium layer; and the backlight unit facing the liquid crystal element;

a liquid crystal display panel which includes an array substrate, a counter substrate arranged opposite to the array substrate with a gap therebetween, and a liquid crystal layer interposed between the array substrate and the counter substrate;

a polarizer which is interposed between the liquid crystal element and the backlight unit; and another polarizer provided on an outer surface of the counter substrate;

the array substrate and the optical sheet being opposed to each other, the polarizer and the another polarizer having transmission axes that are parallel to the first direction, the liquid crystal element being configured to receive light polarized in the first direction and emits the light as light polarized in the first direction or the second direction, and the optical sheet being configured to receive, from the liquid crystal element, light polarized in the first direction, maintain the light polarized in the first direction, diffuse the light and emit the light diffused, and to receive, from the liquid crystal element, light polarized in the second direction, maintain the light polarized in the second direction, collimate the light in a direction normal to the optical sheet and emit the light.

According to another aspect of the invention, there is provided a method of manufacturing an optical sheet, comprising:

preparing an isotropic medium layer having a first surface and a plurality of ridge-shaped projections made on the first surface, arranged in a first direction and extending in a second direction intersecting with the first direction at right angles, each of the projections having a cross section shaped like a segment of a circle;

dripping, coating or applying nematic liquid crystal polymer to the first surface of the isotropic medium layer prepared; and laying, on the first surface of the isotropic medium layer, an anisotropic medium layer having a second surface and a plurality of groove-shaped recesses made in the second surface, arranged in the first direction and extending in the second direction, with the respective projections firmly fitted in the respective recesses, each of the recesses having a cross section shaped like a segment of a circle.

According to another aspect of the invention, there is provided a method of manufacturing an optical sheet, comprising:

preparing an isotropic medium layer having a first surface and a plurality of ridge-shaped projections made on the first surface, arranged in a first direction and extending in a second direction intersecting with the first direction at right angles, each of the projections having a substantially triangular cross section, the cross section of each of the projections having a substantially right-angled apex defined by two sides which have substantially the same length and which extend from the first surface;

dripping, coating or applying nematic liquid crystal polymer to the first surface of the isotropic medium layer prepared; and laying, on the first surface of the isotropic medium layer, an anisotropic medium layer having a second surface and a plurality of groove-shaped recesses made in the second surface, arranged in the first direction and extending in the second direction, with the respective projections firmly fitted in the respective recesses, each of the recesses having a substantially triangular cross section, the cross section of each of the recesses having a substantially right-angled apex defined by two sides which have substantially the same length and which recede from the second surface.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a sectional view of a liquid crystal display according to the first embodiment of this invention;

FIG. 4 is a sectional view of the liquid crystal display panel shown in FIG. 3;

FIG. 5 is a sectional view of the electric-field-controlled panel shown in FIG. 3;

FIG. 11 is a diagram explaining the path in which backlight beams travels while a voltage is being applied to the electric-field-controlled panel shown in FIGS. 8 and 9;

DETAILED DESCRIPTION OF THE INVENTION

Figure 1:
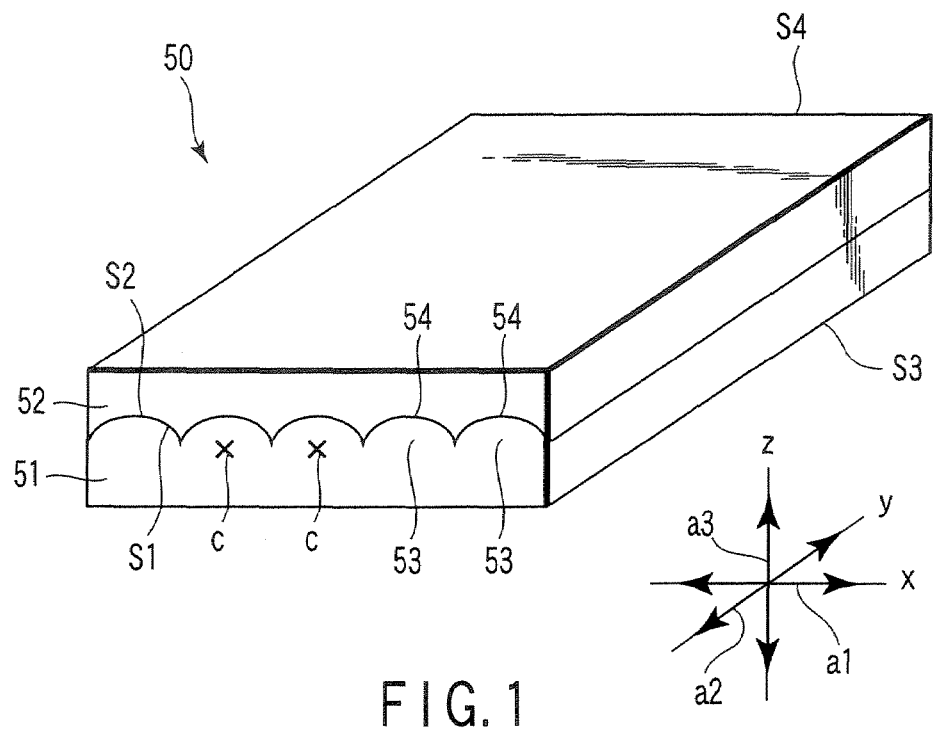
FIG. 1 is a perspective view showing an optical sheet for use in first and second embodiments of the present invention.

An optical sheet and a liquid crystal display having the optical sheet, both according to the first embodiment of the present invention, will be described in detail with reference to the drawings.

FIGS. 3 to 5 show a liquid crystal display that has a 15-inch screen, the aspect ratio of which is 4:3. The liquid crystal display is of transmission type and has a liquid crystal display panel 1 and a lighting apparatus 2. The display panel 1 is of the MVA (Multi-domain Vertically Aligned) type. The lighting apparatus 2 has a backlight unit 7, an electric-field-controlled panel 3, and a first polarizer 4. The backlight unit 7 arranged opposite to the liquid crystal display panel 1 with a space therebetween. The electric-field-controlled panel 3 is interposed between the liquid crystal display panel 1 and the backlight unit 7. The liquid crystal display further has a second polarizer 5.

The liquid crystal display panel 1 comprises an array substrate 10, a counter substrate 20, and a liquid crystal layer 30. The array substrate 10 has a glass substrate 11, a plurality of pixel electrodes 12 formed on the glass substrate, and an alignment film 13 formed on the glass substrate 11 and covering the pixel electrodes 12. The array substrate 10 has various wires (not shown), thin film transistors (TFTs), and the like, all provided on glass substrate 11. The TFTs are used as switching elements. The counter substrate 20 has a glass substrate 21, a common electrode 22 formed on the glass substrate 21, and an alignment film 23 formed on the common electrode 22. The pixel electrodes 12 and the common electrode 22 are made of transparent conductive material, such as indium tin oxide (ITO). Alignment film treatment (rubbing) has been performed on the alignment film 13 and the alignment film 23.

The array substrate 10 and the counter substrate 20 are arranged opposite to each other with a predetermined gap therebetween by spacers 31. The array substrate 10 and the counter substrate 20 are bonded to each other with a sealing member 32 provided in the edge portions of both substrates 10 and 20. A liquid crystal layer 30 is held in a space defined by the array substrate 10, the counter substrate 20, and the seal member 32.

The back light unit 7 is provided on the outer surface of the array substrate 10. The back light unit 7 has a light-guiding member 41, a light source 42, and a reflecting plate 43. The light-guiding member 41 has a light-diffusing plate. The light source 42 is arranged opposite to one side of the light-guiding member 41. The reflecting plate 43 reflects the light emitted from the light source 42. The light reflected is applied to the light-guiding member 41. The light travels through the light-guiding member 41, changing to diffused light. The diffused light emerges, as backlight beams, from the member 41.

The electric-field-controlled panel 3 has an optical sheet 50, a transparent substrate 60, and a liquid crystal element 80. The transparent substrate 60 is made of glass or the like and arranged opposite to the optical sheet 50 with a predetermined gap therebetween. The liquid crystal element 80 is interposed between the optical sheet 50 and the transparent substrate 60.

The optical sheet 50 has a transparent, isotropic medium layer 51 and an anisotropic medium layer 52. The anisotropic medium layer 52 contacts the isotropic medium layer 51. The isotropic medium layer 51 faces the back light unit 7. The anisotropic medium layer 52 faces the array substrate 10. The liquid crystal element 80 has a first transparent electrode 81, an alignment film 82, a second transparent electrode 83, an alignment film 84, spacers 85, and a liquid crystal layer 86. The first transparent electrode 81 and the alignment film 82 are provided on the isotropic medium layer 51. The second transparent electrode 83 and the alignment film 84 are provided on the transparent substrate 60. The spacers 85 and the liquid crystal layer 86 are provided between the alignment films 82 and 84.

The spacers 85 keep the alignment films 82 and 84 spaced apart, providing a gap between these films 82 and 84. The liquid crystal layer 86 is interposed between the alignment films 82 and 84. The isotropic medium layer 51 and the transparent substrate 60 are bonded together by a sealing member (not shown) provided in the edge portions of the alignment films 82 and 84.

The thickness of the liquid crystal layer 86 is 4.8 μm. The layer 86 is made of a specific chiral material that exhibits retardation (Δn) of 0.091 with respect to light having wavelength of 550 nm. The liquid crystal molecules constituting the chiral material have a twist angle of 90° and twist pitch of 60 μm. The molecules are twisted counterclockwise. Hence, the liquid crystal element 80 is of twisted nematic (TN) type.

The liquid crystal display panel 1 and the electric-field-controlled panel 3 are arranged opposite to the glass substrate 11 and the anisotropic medium layer 52, respectively. The first polarizer 4 is arranged on the outer surface of the transparent substrate 60. The second polarizer 5 is arranged on the outer surface of the glass substrate 21. The backlight unit 7 is provided on the outer surface of the first polarizer 4.

The planes of the liquid crystal display panel 1, electric-field-controlled panel 3, first polarizer 4 and second polarizer 5 are parallel to one another.

The configuration of the optical sheet 50 will be described in detail. In the following description, two directions that intersect with each other at right angles in the plane of the sheet 50 will be referred to as first direction a1 (X-axis direction) and second direction a2 (Y-axis direction) a2, respectively, and a direction normal to the optical sheet 50 will be referred to as third direction a3 (Z-axis direction).

Figure 2:
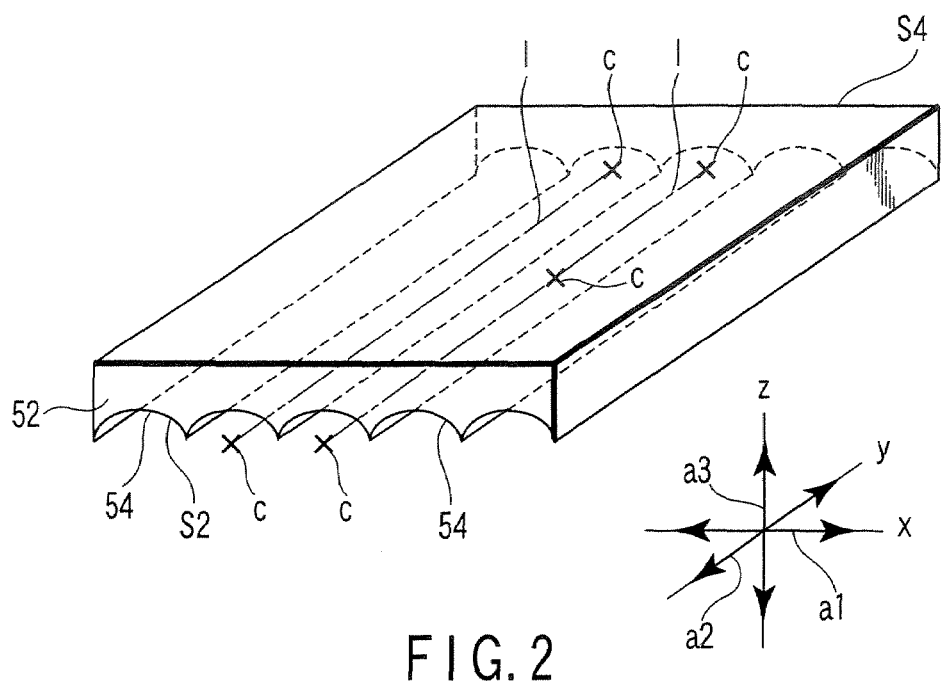
FIG. 2 is a perspective of the anisotropy medium layer shown in FIG. 1.

As shown in FIGS. 1, 2 and 5, the isotropic medium layer 51 is made of transparent, high-molecular material, i.e., isotropic medium. The isotropic medium layer 51 has a plurality of ridge-shaped projections 53 on a first surface S1. The projections 53 are arranged in the first direction a1 and extend parallel in the second direction a2. Each projection 53 has a cross section that is shaped like a segment of a circle.

The anisotropic medium layer 52 is made of nematic liquid crystal polymer that is used as refractive-index anisotropic medium that is optically positive uniaxial. Note that this polymer has been prepared by polymerizing nematic liquid crystal. The anisotropic medium layer 52 has a plurality of groove-shaped recesses 54 on a second surface S2. The recesses 54 are arranged in the first direction a1 and extend parallel in the second direction a2. Each recess 54 has a cross section that is shaped like a segment of a circle. The anisotropic medium layer 52 has an optical axis that is parallel to the second direction a2. Note that the term "segment of a circle" means a semicircle and a segment of an arc, too. The isotropic medium layer 51 and the anisotropic medium layer 52 are laid one on the other, with the respective projections 53 fitted in the respective recesses 54. The isotropic medium layer 51 has a third surface S3 that is smooth and faces away from the first surface S1. The anisotropic medium layer 52 has a fourth surface S4 that is smooth and faces away from the second surface S2.

The recesses 54 of the anisotropic medium layer 52 have a centerline I each. The centerline I passes several centers c of each recess 54. The centerline I extends, substantially parallel to the second direction a2. In the present embodiment, the centers c of the recesses 54 are arranged at pitch of 30 μm.

The anisotropic medium layer 52 has a refractive index nx(2) in the first direction a1 and a refractive index ny(2) in the second direction a2. The refractive index nx(2) is ordinary index no, and the refractive index ny(2) is extra ordinary index ne. The refractive index nx(2) is given as follows:

$$n(1)=nx(2)$$

where n(1) is the refractive index of the isotropic medium layer 51.

In the present embodiment, the refractive indices n(1), nx(2) and ny(2) are 1.732, 1.732 and 1.513, respectively, with respect to light having wavelength of 550 nm.

A method of manufacturing the liquid crystal display according to the first embodiment will be explained.

A method of manufacturing the optical sheet 50 will be explained first. First, a transparent isotropic medium layer 51 is prepared, which has projections 53 formed on the first surface S1, arranged in the first direction a1 and extending in the second direction a2. Next, nematic liquid crystal polymer is applied to the entire first surface S1 of the isotropic medium layer 51 thus prepared. The nematic liquid crystal polymer is in nematic phase (i.e., in the state of liquid crystal).

Then, the anisotropic medium layer 52 is laid on the first surface S1 of the isotropic medium layer 51. As a result, the projections 53 on the first surface S1 of the layer 51 are fitted in the recesses 54 made in the second surface S2, arranged in the first direction a1 and extending in the second direction a2. Needless to say, the anisotropic medium layer 52 is laid on the isotropic medium layer 51, with each recess 54 firmly holding the corresponding projection 53 of the isotropic medium layer 51. The optical sheet 50 is thereby fabricated. The optical sheet 50 has a diagonal of 15 inches and an aspect ratio of 4:3.

Next, a first transparent electrode 81 made of transparent electrically conductive material, such as ITO, is formed on the entire upper surface of the isotropic medium layer 51 of the optical sheet 50. Then, material of alignment film is applied to the first transparent electrode 81 and then backed, providing an alignment film 82. Rubbing is performed on the alignment film 82 thus formed.

Meanwhile, a transparent substrate 60, such as a glass substrate, is prepared. Transparent, electrically conductive material, e.g., ITO, is applied to the entire upper surface of the transparent substrate 60, thereby forming a second transparent electrode 83. Further, a plurality of spacers 85 are formed on the second transparent electrode 83. Then, material of alignment film is applied to the second transparent electrode 83 and then baked, providing an alignment film 84. Rubbing is performed on the alignment film 84.

Sealing material is applied to the edge parts of the alignment film 84. The alignment film 82 and the alignment film 84 are bonded to each other, at their edge parts. The optical sheet 50 and the transparent substrate 60 are thereby bonded together. The alignment film 82 has been rubbed in the first direction a1, whereas the alignment film 84 has been rubbed in the second direction a2.

Thereafter, vacuum injection is performed, injecting liquid crystal into the gap between the alignment films 82 and 84 through a liquid-crystal intake made in the sealing member. After the liquid crystal has been injected into the gap, the liquid-crystal intake is sealed with sealant (not shown). The liquid crystal element 80 is thereby fabricated. In the liquid crystal element 80 thus fabricated, the major axes of the liquid crystal molecules facing the alignment film 82 are parallel to the first direction a1 as long as no voltage is applied between the first transparent electrode 81 and the second transparent electrode 83.

Next, the first polarizer 4 is bonded to the outer surface of the transparent substrate 60, using, for example, glue. The first polarizing plate 4 has a transmission axis that extends in the first direction a1. The backlight unit 7 is arranged on the outer surface of the first polarizer 4. The liquid crystal display panel 1 is designed such that the liquid crystal molecules of the liquid crystal layer 30 may tilt at 45°, 135°, 225° and 315° to the second direction a2 when a voltage is applied between the pixel electrodes 12 and the common electrode 22. Thereafter, the second polarizer 5 is bonded with glue, for example, to the outer surface of the glass substrate 21 of the liquid crystal display panel 1. The second polarizer 5 has a transmission axis that extends in the first direction a1.

The principle in which the controlling the angle of visibility of the liquid crystal display (i.e., the angle at which the backlight beam is diffused) by means of the electric-field-controlled panel 3 and the first polarizer 4 will be explained below.

How the angle of visibility is controlled while no voltage is being applied between the transparent electrodes 81 and 83 of the liquid crystal element 80 (that is, while no electric field is being applied to the liquid crystal layer 86) will be explained first.

Figure 6:
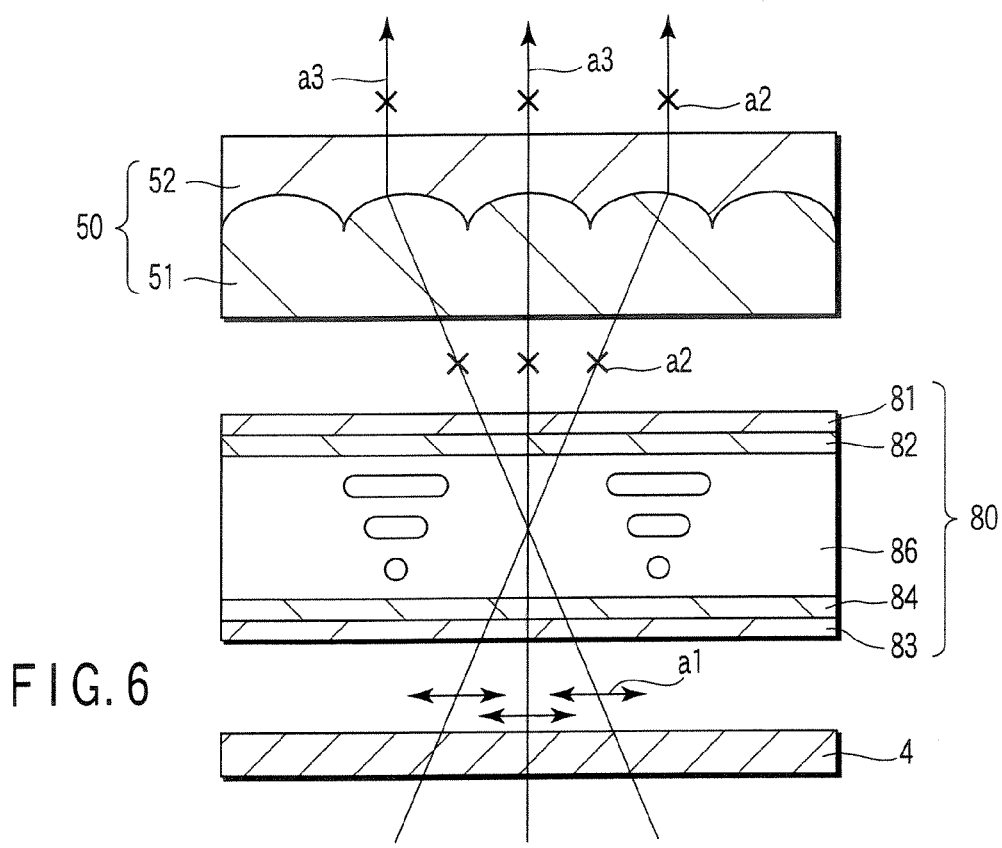
FIG. 6 is a diagram explaining the path in which backlight beams travels while no voltage is being applied to the electric-field-controlled panel shown in FIGS. 3 and 5.

As shown in FIG. 6, the first polarizer 4 receives diffused light from the backlight unit 7 and polarizes the diffused light in the first direction a1. The light thus polarized is applied to the liquid crystal element 80. The liquid crystal element 80 changes the polarization direction of the polarized light by 90°, to the second direction a2. The light thus changed in direction, i.e., light polarized in the second direction a2, is applied to the optical sheet 50. The optical sheet 50 maintains the polarized direction of the light, collimates the polarized light in the third direction a3, i.e., a direction normal to the optical sheet 50, and emits the light thus collimated. That is, the light polarized in the second direction a2 and applied to the optical sheet 50 is refracted at the interface between the isotropic medium layer 51 and the anisotropic medium layer 52 and emerges in the third direction a3.

Thus, in the electric-field-controlled panel 3, the light is polarized in the second direction a2 while no voltage is being applied between the transparent electrodes 81 and 83 and the polarized light collimated in the third direction a3 is applied to the liquid crystal display panel 1.

The principle of controlling the angle of visibility while a voltage is being applied between the transparent electrodes 81 and 83 of the liquid crystal element 80 (that is, an electric field is being applied to the liquid crystal layer 86) will be explained.

Figure 7:
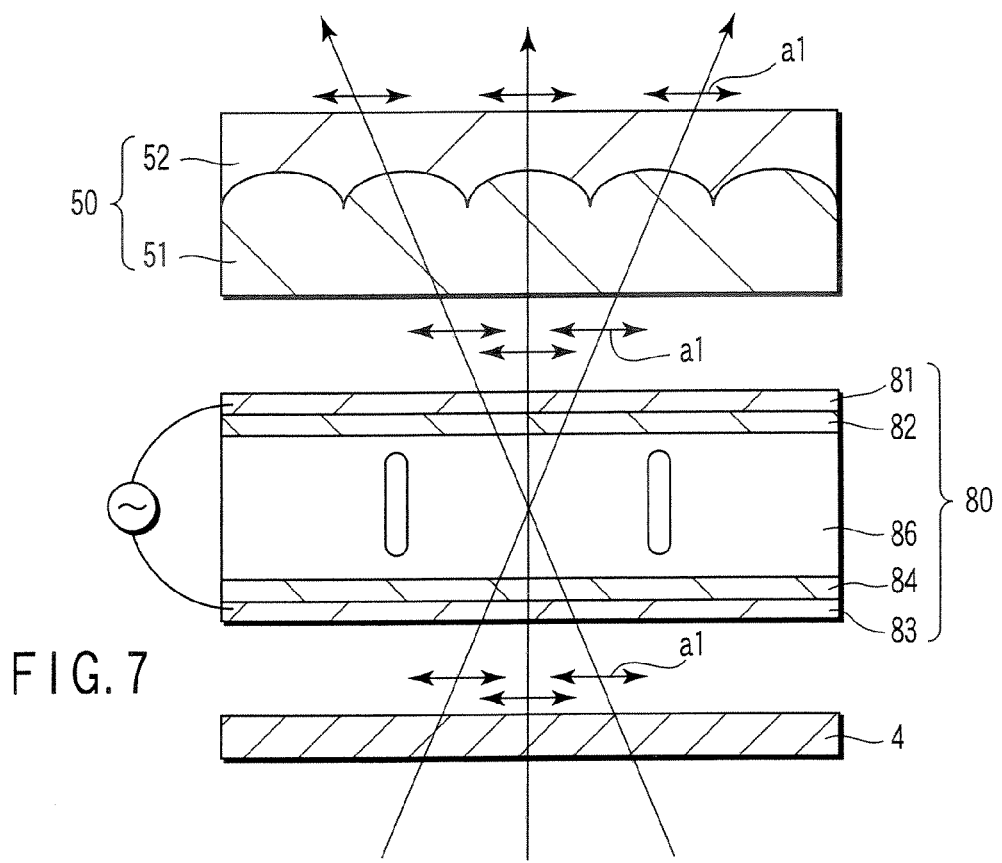
FIG. 7 is a diagram explaining the path in which backlight beams travels while a voltage is being applied to the electric-field-controlled panel shown in FIGS. 3 and 5.

As shown in FIG. 7, the first polarizer 4 receives diffused light from the backlight unit 7 and polarizes the diffused light in the first direction a1. The light thus polarized is applied to the liquid crystal element 80. The liquid crystal element 80 receives the light polarized in the first direction a1, maintains the light polarized in the first direction a1, and supplies the light, which is polarized in the first direction a1, to the optical sheet 50. The optical sheet 50 maintains the polarized direction of the light, diffuses the light, and emits the light diffused. That is, the light polarized in the first direction a1 and applied to the optical sheet 50 travels straight in the interface between the isotropic medium layer 51 and the anisotropic medium layer 52 and emerges.

Thus, the electric-field-controlled panel 3 emits light polarized in the first direction a1 and diffused, to the liquid crystal display panel 1, while a voltage is being applied between the transparent electrodes 81 and 83.

As can be understood from the explanation of the principle of controlling the angle of visibility, the degree to which the optical sheet 50 collimates the polarized light applied to it depends upon the direction in which the light is polarized. Hence, the liquid crystal panel 1 operates in normally black mode, and its surface looks black, while no voltage is being applied between the transparent electrodes 81 and 83. While no voltage is being applied between the transparent electrodes 81 and 83, the liquid crystal panel 1 operates in normally white mode, and its surface looks white.

Hence, the display mode of the liquid crystal display panel 1 is switched, from one to the other, in accordance with whether or not a voltage is applied between the transparent electrodes 81 and 83 of the liquid crystal element 80. Therefore, to display images on the liquid crystal display, the voltage (i.e., drive voltage) applied between the pixel electrodes 12 and the common electrode 22 is inverted in accordance with whether or not a voltage is applied between the transparent electrodes 81 and 83 of the liquid crystal element 80.

The inventor thereof conducted experiments on a liquid crystal display according to the present embodiment. First, he applied no voltage between the transparent electrodes 81 and 83 of the liquid crystal element 80, causing the display to show images. Then, he applied a voltage between the transparent electrodes 81 and 83 of the liquid crystal element 80, causing the display to show images. The image displayed in the first case were compared with those displayed in the second case, in terms of luminance visual angle, contrast visual angle, front luminance and front contrast.

In the experiments, a drive voltage of 4V was applied to TFTs in the liquid crystal display panel 1, and a drive voltage of 5V was applied to the liquid crystal element 80 (more precisely, 5V was applied between the transparent electrodes 81 and 83), thus driving the liquid crystal element 80. The backlight unit 7 was turned on, setting the liquid crystal display at luminance of 0 lx (lux).

The characteristics that the liquid crystal display exhibited while a voltage was being applied to the liquid crystal element 80 (or between the first transparent electrode 81 and the second transparent electrode 83) will be described.

The angle of visibility was as large as 60° to both the left and the right at luminance of 30 cd/m$^2$ or more, and was as large as 80° to both the left and right at contrast ratio of 10:1 or more. The front luminance was 200 cd/m$^2$ or more, which is sufficiently high. Thus, the liquid crystal display has luminance and luminance visual angle that are as high and large as those of liquid crystal displays having no components equivalent to the electric-field-controlled panel 3. In addition, the display has front contrast of 200:1, which is sufficiently high.

The characteristics that the liquid crystal display exhibited while no voltage was being applied to the liquid crystal element 80 (or between the transparent electrodes 81 and 83) will be described.

The angle of visibility was as small as 10° to both the left and the right at luminance of 30 cd/m$^2$ or more. The front luminance was 400 cd/m$^2$, and the front contrast was 600:1. That is, the front luminance and the front contrast were higher than in the displays having no component equivalent to the electric-field-controlled panel 3 or in the case where a voltage was applied to the liquid crystal element 80.

In the optical sheet 50 and the liquid crystal display described above, the electric-field-controlled panel 3 is provided between the liquid crystal display panel 1 and the backlight unit 7. The electric-field-controlled panel 3 has the optical sheet 50 (FIGS. 1 and 2) and the liquid crystal element 80 (FIG. 5).

The optical sheet 50 has an isotropic medium layer 51 and an anisotropic medium layer 52. The isotropic medium layer 51 has a plurality of projections 53 on a first surface S1. The projections 53 are made of an optically isotropic medium, arranged in the first direction a1 and extend parallel in the second direction a2. Each projection 53 has a cross section that is shaped like a segment of a circle. The anisotropic medium layer 52 is made of an optically uniaxial medium and has a plurality of recesses 54 on a second surface S2. The recesses 54 are arranged in the first direction a1 and extend parallel in the second direction a2. Each recess 54 has a cross section that is shaped like a segment of a circle. The isotropic medium layer 51 has a refractive index n(1) that is equal to the refractive index nx(2) that the anisotropic medium layer 52 has with respect to the first direction a1.

The liquid crystal element 80 is of TN type, having the first transparent electrode 81, alignment film 82, second transparent electrode 83, alignment film 84 and liquid crystal layer 86. The first transparent electrode 81 and the alignment film 82 are provided on the isotropic medium layer 51. The second transparent electrode 83 and the alignment film 84 are provided on the transparent substrate 60.

The display mode of the liquid crystal display panel 1 is changed, from one to the other, in accordance with whether or not a voltage is applied between the transparent electrodes 81 and 83. Thus, the liquid crystal element 80 receives light polarized in the first direction a1 and emits the light in the first direction or the light polarized in the second direction a2. The optical sheet 50 receives from the liquid crystal element 80 the light polarized in the first direction a1, maintains the polarized direction of the light, diffuses the light, and emits the light diffused. The optical sheet 50 may receive, from the liquid crystal element 80, light polarized in the second direction a2, may maintain the polarized direction of the light, may collimate the light in the third direction a3, and emits the light collimated. Thus, the optical sheet 50 can controls the direction in which the polarized light applied to it travels.

To display images at a small angle of visibility, no voltage is applied between the transparent electrodes 81 and 83 of the liquid crystal element 80. To display images at a large angle of visibility, a voltage may be applied between the transparent electrodes 81 and 83 of the liquid crystal element 80. Thus, the angle of visibility can be easily controlled, merely by operating a switch (not shown) or a dial (not shown) provided on the liquid crystal display.

Assume that this liquid crystal display is mounted on a mobile PC, a cellular telephone, a PDA, an electronic pocket diary, a tablet PC, or the like, which may be used in public. The angle of visibility may be reduced if the information displayed should be concealed from anyone but the user. In this case, the user need not worry about someone else's access to the information. By contrast, the angle of visibility may be increased if the information displayed should be disclosed not only to the user, but also to some other persons. In this manner, the trouble that displayed contents are undesirably monitored can be avoided. Further, if desired, more than one person can monitor the displayed image at the same time easily.

The centerline l that passes the recesses 54 of the anisotropic medium layer 52 is substantially parallel to the second direction a2. The centers c of the recesses 54 are arranged at pitch of 30 μm. Therefore, the light (i.e., backlight or external light) is scarcely diffracted at the optical sheet 50. The pattern of the recesses 54 of the anisotropic medium layer 52 (and the projections 53 of the isotropic medium layer 51) cannot be seen to the naked eye. Hence, the use of the optical sheet 50 would not impair the quality of images displayed. The advantage mentioned above can be achieved only if the centers c of the recesses 54 are arranged at pitch of 10 μm to 70 μm.

The electric-field-controlled panel 3 is interposed between the liquid crystal display panel 1 and the backlight unit 7. In other words, the panel 3 faces away from the display screen of the liquid crystal display panel 1. Therefore, the pattern of the optical sheet 50 of the panel 3 is hardly visible from the display screen. Even if external light is applied to the panel 3, no adverse event such as interference will take place.

The first polarizer 4 is interposed between the electric-field-controlled panel 3 and the backlight unit 7. The polarizer 4 has a transmission axis that is parallel to the first direction a1. The first polarizer 4 can therefore polarize the backlight beams in the first direction a1. The light thus polarized is applied from the polarizer 4 to the electric-field-controlled panel 3.

Nematic liquid crystal polymer is applied to the entire first surface S1 of the isotropic medium layer before the anisotropic medium layer 52 is laid on the isotropic medium layer 51. Instead, the polymer may be dripped onto the first surface S1 or applied thereto by coating.

The anisotropic medium layer 52 is made of nematic liquid crystal polymer. Nonetheless, it may be made of nematic liquid crystal. If this is the case, the nematic liquid crystal may be applied to the entire first surface S1, may be dripped onto the first surface S1 or may be applied to the first surface S1 by coating.

Before the anisotropic medium layer 52 is laid on the isotropic medium layer 51, nematic liquid crystal in the isotropic state (in liquid state) may be dripped onto the first surface S1 of the isotropic medium layer, may be coated on the first surface S1 or may be applied to the first surface S1. Ultraviolet rays may then be applied to the nematic liquid crystal, polymerizing the liquid crystal, and the anisotropic medium layer 52 is then laid on the isotropic medium layer 51.

The liquid crystal element 80 is of NT type. Instead, it may be the birefringence (ECB) type that is electrically controlled. Since the backlight unit 7 has the light-guiding member 41 containing a light-diffusing plate, the unit 7 can emit diffused light.

The liquid crystal display according to this embodiment has no louver sheets. The transmittance to the backlight beams does not decrease as in the case where louvers used absorb the backlight beams. This prevents the luminance from decreasing. Having no louver sheets, the liquid crystal display can be thinner and be manufactured at a lower cost, than otherwise.

Thus, this invention can provide a liquid crystal display in which the decrease in luminance can be suppressed and the angle of visibility can be controlled to any desired value.

An optical sheet and a liquid crystal display having the optical sheet, both according to a second embodiment of the invention, will be described. In this embodiment, the liquid crystal display panel 1 and the lighting apparatus 2 are similar in configuration to the liquid crystal panel and the lighting apparatus, both described above. The components identical to those of the first embodiment are designated at the same reference numbers and will not be described in detail.

Figure 8:
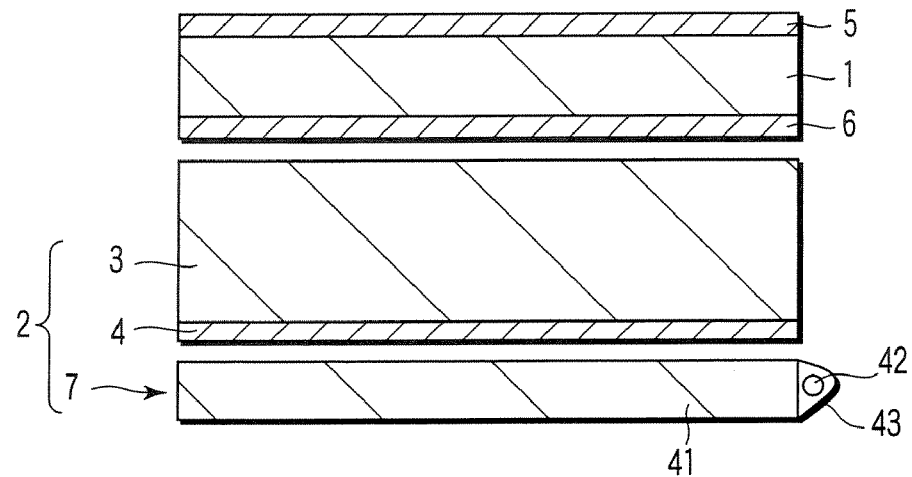
FIG. 8 is a sectional view showing a liquid crystal display according to the second embodiment of the invention.
Figure 9:
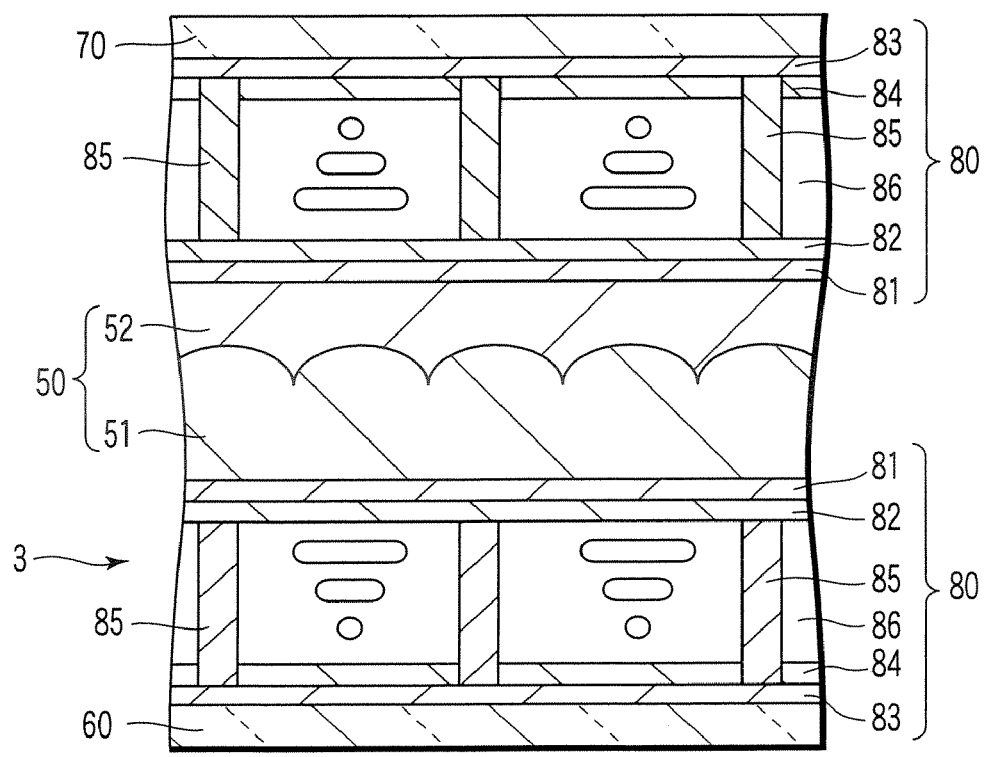
FIG. 9 is a sectional view showing the electric-field controlled panel shown in FIG. 8.

As FIGS. 8 and 9 show, the liquid crystal display is a 15-inch display having an aspect ratio of 4:3. The liquid crystal display has a crystal display panel 1 and a lighting apparatus 2. The lighting apparatus 2 has a backlight unit 7, an electric-field-controlled panel 3, and a first polarizer 4. The backlight unit 7 arranged opposite to the liquid crystal display panel 1 with a space therebetween. The electric-field-controlled panel 3 is interposed between the liquid crystal display panel 1 and the backlight unit 7. The liquid crystal display further has a second polarizer 5 and a third polarizer 6.

The electric-field-controlled panel 3 has an optical sheet 50, two transparent substrates 60 and 70, and two liquid crystal elements 80. The transparent substrates 60 and 70 are made of glass or the like. The substrates 60 and 70 are opposed to each other, across the optical sheet 50. The substrates 60 and 70 are arranged to the optical sheet 50 with predetermined gaps. One liquid crystal element 80 is interposed between the optical sheet 50 and the transparent substrate 60. The other liquid crystal element 80 is interposed between the optical sheet 50 and the transparent substrate 70. Thus, the electric-field-controlled panel 3 has a pair of liquid crystal elements 80 which are provided on sides of the optical sheet 50.

The optical sheet 50 has a transparent, isotropic medium layer 51 and an anisotropic medium layer 52. The anisotropic medium layer 52 contacts the isotropic medium layer 51. The isotropic medium layer 51 faces the back light unit 7. The anisotropic medium layer 52 faces the array substrate 10. Each of the two liquid crystal elements 80 has a first transparent electrode 81, an alignment film 82, a second transparent electrode 83, an alignment film 84, spacers 85, and a liquid crystal layer 86. The first transparent electrode 81 and the alignment film 82 are provided on the optical sheet 50. The second transparent electrode 83 and the alignment film 84 are provided on the transparent substrate 60 or on the other transparent substrate 70. The spacers 85 are provided between the alignment films 82 and 84.

In each liquid crystal element 80, the spacers 85 keep the alignment films 82 and 84 spaced apart, providing a gap between these films 82 and 84. The liquid crystal layer 86 is interposed between the alignment films 82 and 84. The isotropic medium layer 51, the transparent substrate 60 and the other transparent substrate 70 are bonded together by sealing members (not shown) provided in the edge portions of the alignment films 82 and 84.

The thickness of each liquid crystal layer 86 is 4.8 μm.

The layer 86 of the liquid crystal element 80 contacting the isotropic medium layer 51 is made of a specific chiral material that exhibits retardation (Δn) of 0.091 with respect to light having wavelength of 550 nm. The liquid crystal molecules constituting the chiral material have a twist angle of 90° and twist pitch of 60 μm. The molecules are twisted counterclockwise. Hence, the liquid crystal element 80 provided at the backlight unit 7 side is of TN type.

The layer 86 of the liquid crystal element 80 contacting the anisotropic medium layer 52 is made of a specific chiral material that exhibits retardation (Δn) of 0.091 with respect to light having wavelength of 550 nm. The liquid crystal molecules constituting the chiral material have a twist angle of 90° and twist pitch of 60 μm. The molecules are twisted clockwise. Hence, the liquid crystal element 80 provided at the array substrate 10 side is of TN type.

The glass substrate 11 of the liquid crystal display panel 1 and the other transparent substrate 70 of the electric-field-controlled panel 3 are arranged opposite to each other. The first polarizer 4 is arranged on the outer surface of the transparent substrate 60. The second polarizer 5 is arranged on the outer surface of the glass substrate 21. It suffices to interpose the third polarizer 6 between the glass substrate 11 and the other transparent substrate 70. The backlight unit 7 is provided on the outer surface of the first polarizer 4.

The planes of the liquid crystal display panel 1, electric-field-controlled panel 3, first polarizer 4, second polarizer 5 and third polarizer 6 are parallel to one another.

A method of manufacturing the liquid crystal display according to the second embodiment will be explained.

First, the optical sheet 50 is formed in the same way as in the first embodiment described above. In the second embodiment, the optical sheet 50 has a diagonal of 15 inches and an aspect ratio of 4:3. Next, the first transparent electrodes 81 made of transparent, electrically conductive material, e.g., ITO, are formed on the entire upper surface of isotropic medium layer 51 and on the entire upper surface of the anisotropic medium layer 52, respectively. Then, material of alignment film is applied to the first transparent electrodes 81 and then baked, providing alignment films 82. Rubbing is performed on the alignment films 82.

Meanwhile, the transparent substrate 60 and the other transparent substrate 70, such as glass substrates, are prepared. Transparent, electrically conductive material, e.g., ITO, is applied to the entire upper surface of the transparent substrate 60 and the entire upper surface of the other transparent substrate 70, forming second transparent electrodes 83. Further, spacers 85 are formed on the second transparent electrodes 83. Then, material of alignment film is applied to the second transparent electrodes 83 and then baked, providing alignment films 84. Rubbing is performed on these alignment films 84.

Sealing material is applied to the edge parts of each alignment film 84. The alignment films 82 are bonding to the alignment films 84, respectively, at their edge parts. The transparent substrate 60, the other transparent substrate 70 and the optical sheet 50 are thereby bonded together. Each alignment film 82 has been rubbed in the first direction a1, whereas each alignment film 84 has been rubbed in the second direction a2.

Thereafter, vacuum injection is performed, injecting liquid crystal into the gap between each pair of alignment films 82 and 84 through a liquid-crystal intake made in the sealing member. After the liquid crystal has been injected into the gap, the liquid-crystal intake is sealed with sealant (not shown). The pair of liquid crystal elements 80 are thereby fabricated. In each of the liquid crystal elements 80 thus fabricated, the major axes of the liquid crystal molecules facing each other the alignment film 82 are parallel to the first direction a1 as long as no voltage is applied between the first transparent electrode 81 and the second transparent electrode 83.

Next, the first polarizer 4 is bonded to the outer surface of the transparent substrate 60, using, for example, glue. The first polarizer 4 has a transmission axis that extends in the first direction a1. The backlight unit 7 is arranged on the outer surface of the first polarizer 4, and the liquid crystal display panel 1 is arranged on the outer surface of the anisotropic medium layer 52. The liquid crystal display panel 1 is designed such that the liquid crystal molecules of the liquid crystal layer 30 may tilt at 45°, 135°, 225° and 315° to the second direction a2 when a voltage is applied between the pixel electrodes 12 and the common electrode 22. Thereafter, the second polarizer 5 is bonded with glue, for example, to the outer surface of the glass substrate 21 of the liquid crystal display panel 1. The third polarizer 6 is bonded with glue, for example, to the outer surface of the glass substrate 11. The second polarizer 5 and the third polarizer 6 have transmission axes that extend in the first direction a1.

The principle of controlling the angle of visibility of the liquid crystal display (i.e., the angle at which the backlight beam is diffused) by means of the electric-field-controlled panel 3 and first polarizer 4 will be explained below.

How the angle of visibility is controlled while no voltage is being applied between the first and second transparent electrodes 81 and 83 of each liquid crystal element 80 (that is, while no electric field is being applied to the liquid crystal layer 86) will be explained first.

Figure 10:
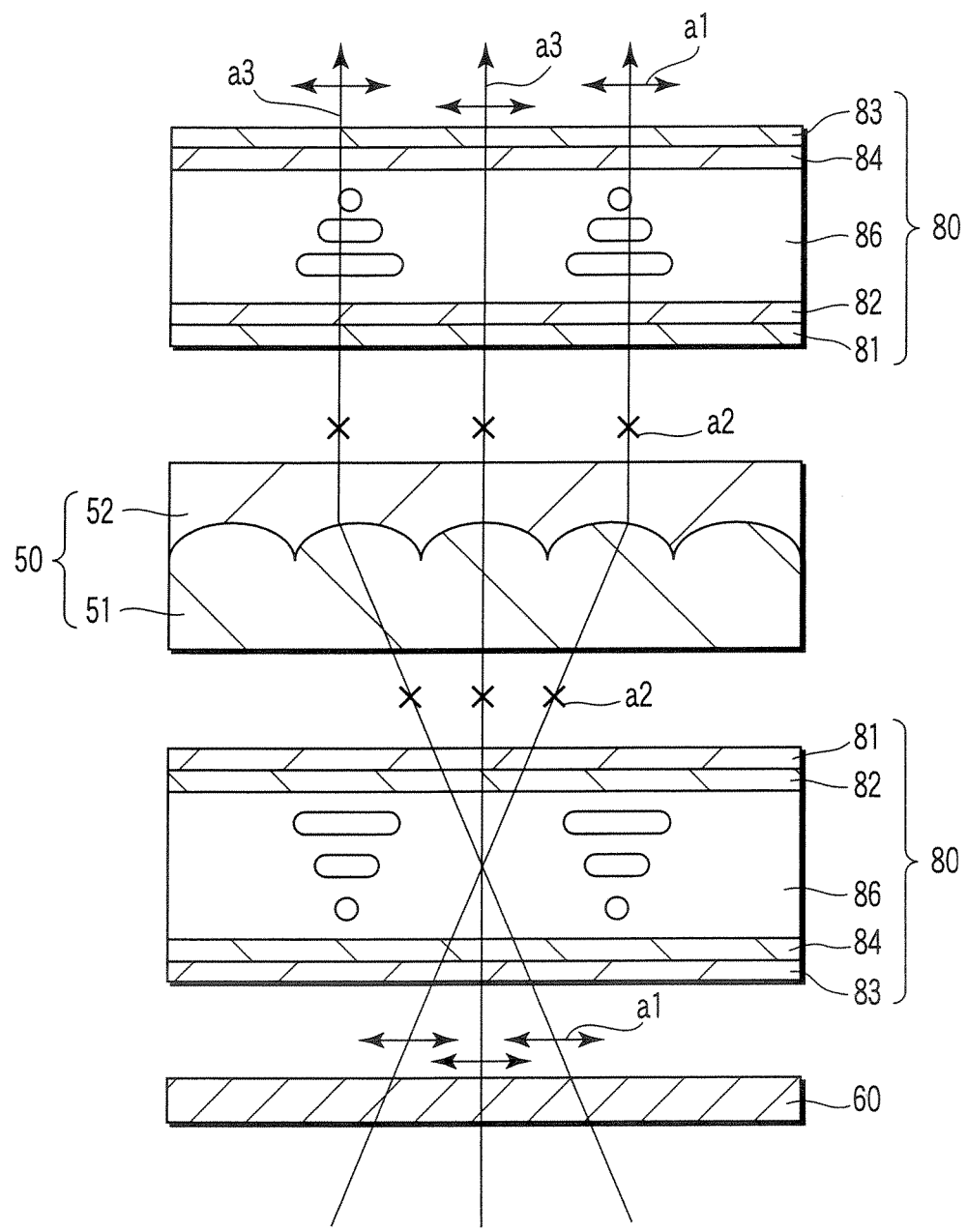
FIG. 10 is a diagram explaining the path in which backlight beams travels while no voltage is being applied to the electric-field-controlled panel shown in FIGS. 8 and 9.

As shown in FIG. 10, the first polarizer 4 receives the diffused light from the backlight unit 7 and polarizes the light in the first direction a1. The light thus polarized is applied to the liquid crystal element 80 that is provided at the isotropic medium layer 51. The liquid crystal element 80 located at the isotropic medium layer 51 changes the polarization direction of the polarized light by 90° to the second direction a2. The light thus changed in direction, i.e., light polarized in the second direction a2, is applied to the optical sheet 50.

The optical sheet 50 maintains the polarized direction of the light, collimates the polarized light in the third direction a3, i.e., direction normal to the optical sheet 50, and emits the light thus collimated. That is, the light polarized in the second direction a2 and applied to the optical sheet 50 is refracted at the interface between the isotropic medium layer 51 and the anisotropic medium layer 52 and emerges in the third direction a3.

The liquid crystal element 80 that is provided at the anisotropic medium layer 52 receives the collimated, polarized light from the optical sheet 50, changes the polarization direction of this polarized light by 90° to the first direction a1 and collimates this light in the third direction a3. The light thus collimated is emitted from the liquid crystal element 80.

Thus, the electric-field-controlled panel 3 polarizes light in the first direction a1 and emits polarized light collimated in the third direction a3 to the liquid crystal display panel 1, while no voltage is being applied between each first transparent electrode 81 and the second transparent electrode 83 associated therewith.

The principle of controlling the angle of visibility while a voltage is being applied between each first transparent electrode 81 and the second transparent electrode 83 associated therewith (that is, an electric field is being applied to the liquid crystal layer 86) will be explained.

As shown in FIG. 11, the first polarizer 4 receives the diffused light from the backlight unit 7 and polarizes the diffused light in the first direction a1. The light thus polarized is applied to the liquid crystal element 80 located at the isotropic medium layer 51. The liquid crystal element 80 located at the layer 51 maintains the light polarized in the first direction a1, and supplies the light, which remains polarized in the first direction a1, to the optical sheet 50.

The optical sheet 50 receives the light polarized in the first direction a1, maintains the polarized direction of this light, diffuses the light, and emits the light diffused. That is, the light polarized in the first direction a1 and applied to the optical sheet 50 travels straight in the interface between the isotropic medium layer 51 and the anisotropic medium layer 52 and emerges.

Thus, the liquid crystal element 80 located at the anisotropic medium layer 52 receives the light polarized in first direction a1 and emitted from the optical sheet 50, maintains the light polarized in the direction a1, diffuses this light, and emits the light diffused.

As can be understood from the above, the electric-field-controlled panel 3 emits to the liquid crystal display panel 1 the diffused light polarized in the first direction a1, while a voltage is being applied between each first transparent electrode 81 and the second transparent electrode 83 associated therewith.

As can be seen from the explanation of the principle of controlling the angle of visibility, the degree to which the optical sheet 50 collimates the polarized light applied to it depends upon the direction in which the light is polarized. Hence, the liquid crystal panel 1 operates in normally white mode and its surface looks white, while no voltage is being applied between the pixel electrodes 12 and the common electrode 22, no matter whether a voltage is applied between the transparent electrodes 81 and 83 of each liquid crystal element 80.

Namely, the display mode of the liquid crystal display panel 1 remains unchanged, no matter whether a voltage is applied between the transparent electrodes 81 and 83 of each liquid crystal element 80. Hence, the voltage (drive voltage) to be applied between the pixel electrodes 12 and common electrode 83 of each liquid crystal display panel 1 need not be changed in accordance with whether a voltage is applied between the transparent electrodes 81 and 83 of each liquid crystal element 80.

The inventor thereof conducted experiments on a liquid crystal display according to the present embodiment. First, he applied no voltage between the transparent electrodes 81 and 83 of each liquid crystal element 80, causing the display to show images. Then, he applied a voltage between the transparent electrodes 81 and 83 of each liquid crystal element 80, causing the display to show images. The image displayed in the first case were compared with those displayed in the second case, in terms of luminance visual angle, contrast visual angle, front luminance and front contrast.

In the experiments, a drive voltage of 4V was applied to TFTs in the liquid crystal display panel 1, and a drive voltage of 5V was applied to each liquid crystal element 80 (more precisely, 5V was applied between the transparent electrodes 81 and 83), thus driving the liquid crystal element 80. The backlight unit 7 was turned on, setting the liquid crystal display at luminance of 0 lx.

The characteristics that the liquid crystal display exhibited while a voltage was being applied to each liquid crystal element 80 (or between the first transparent electrode 81 and the second transparent electrode 83) will be described.

The angle of visibility was as large as 60° to both the left and the right at luminance of 30 cd/m$^2$ or more, and was as large as 80° to both the left and right at contrast ratio of 10:1 or more. The front luminance was 200 cd/m$^2$ or more, which is sufficiently high. Thus, the liquid crystal display has luminance and luminance visual angle that are as high and large as those of liquid crystal displays having no components equivalent to the electric-field-controlled panel 3. In addition, the display has front contrast of 600:1, which is sufficiently high.

The characteristics that the liquid crystal display exhibited while no voltage was being applied to each liquid crystal element 80 (or between the first transparent electrodes 81 and the second transparent electrode 83) will be described.

The angle of visibility was as small as 10° to both the left and the right at luminance of 30 cd/m$^2$ or more. The front luminance was 400 cd/m$^2$. This front luminance is higher than in the displays having no component equivalent to the electric-field-controlled panel 3 or in the case where a voltage was applied to the liquid crystal element 80. The front contrast was 600:1.

In the optical sheet 50 and the liquid crystal display configured as described above, the electric-field-controlled panel 3 is interposed between the liquid crystal display panel 1 and the backlight unit 7. The electric-field-controlled panel 3 has a pair of liquid crystal elements 80, one on one side of the optical sheet 50, and the other at the other side thereof. Each liquid crystal element 80 is of the TN type, having the first transparent electrode 81, alignment film 82, second transparent electrode 83, alignment film 84 and liquid crystal layer 86.

The operating state is switched, from one state in which a voltage is applied between the first transparent electrode 81 and the second transparent electrode 83, to the other state in which no voltage is applied between these transparent electrodes 81 and 83, or vice versa, the liquid crystal element 80 located at the isotropic medium layer 51 emits the light polarized in the first direction a1 it has received, as light polarized in the first direction a1 or the second direction a2.

The optical sheet 50 receives the light polarized in the first direction a1, from the liquid crystal element 80 located at the isotropic medium layer 51, maintains the polarized direction of this light, diffuses the light, and emits the light diffused. Further, the optical sheet 50 receives the light polarized in the second direction a2, from the liquid crystal element 80 located at the isotropic medium layer 51, maintains the polarized direction of this light, collimates the light in the third direction a3, and emits the light collimated. Hence, the optical sheet 50 can control the direction in which the polarized light applied to it travels.

The liquid crystal element 80 located at the anisotropic medium layer 52 receives the light polarized in the first direction a1 from the optical sheet 50, maintains the light polarized in the first direction a1, diffuses this light, and emits the light diffused. The liquid crystal element 80 receives light collimated in the third direction a3, from the optical sheet 50, polarizes the light in the first direction, and collimates the light in the third direction a3, and emits the light thus collimated.

To display images at a small angle of visibility, no voltage may be applied between the transparent electrodes 81 and 83 of each liquid crystal element 80. To display images at a large angle of visibility, a voltage may be applied between the transparent electrodes 81 and 83 of each liquid crystal element 80. Thus, the angle of visibility of the liquid crystal display can be easily controlled, merely by operating a switch (not shown) or a dial (not shown) provided on the liquid crystal display.

Assume that this liquid crystal display is mounted on a mobile PC, a cellular telephone, a PDA, an electronic pocket diary, a tablet PC, or the like, which may be used in public. The angle of visibility may be reduced if the information displayed should be concealed from anyone but the user. In this case, the user need not worry about someone else's access to the information. By contrast, the angle of visibility may be increased if the information displayed should be disclosed not only to the user, but also to some other persons. In this manner, the trouble that displayed contents are undesirably monitored can be avoided. Further, if desired, more than one person can monitor the displayed image at the same time easily.

The two liquid crystal elements 80 are of the TN type. The liquid crystal molecules facing the alignment film 82 of the liquid crystal element 80 located at the isotropic medium layer 51 are twisted in the direction opposite to the direction to the liquid crystal molecules facing the alignment film of the liquid crystal element located at the anisotropic medium layer 52. Therefore, the electric-field-controlled panel 3 can maintain the light polarized in the same direction and emits the light, regardless of the wavelength of the light.

The liquid crystal elements 80 need not be of NT type. They may be of the ECB type. If they are of the ECB type, the liquid crystal molecules facing the alignment film 82 of the liquid crystal element 80 located at the isotropic medium layer 51 have major axes that intersect, at right angles, with the major axes of the liquid crystal molecules facing the alignment film of the liquid crystal element located at the anisotropic medium layer 52. Each liquid crystal element 80 shifts the phase of the coming polarized light by half the wavelength of the light. The electric-field-controlled panel 3 can therefore emits light whose phase is identical to that of the light it has received.

The third polarizer 6 is interposed between the electric-field-controlled panel 3 and the array substrate 10. The polarizer 6 has a transmission axis that is parallel to the first direction a1. The first third polarizer 6 can therefore further polarize the polarized light applied to the liquid crystal display panel 1. Thus, the liquid crystal display can be obtained high contrast. The liquid crystal display may not have the third polarizer 6. Having the third polarizer 6, the liquid crystal display achieves higher image contrast than the case where the polarizer 6 is not used.

Thus, this invention can provide a liquid crystal display in which the decrease in luminance can be suppressed and the angle of visibility can be controlled to any desired value.

An optical sheet and a liquid crystal display having the optical sheet, both according to a third embodiment of the invention, will be described with reference to the drawings. In this embodiment, the liquid crystal display panel 1 and the lighting apparatus 2 are similar in configuration to the liquid crystal panel and the lighting apparatus, both described above. The components identical to those of the first embodiment are designated at the same reference numbers and will not be described in detail.

Figure 12:
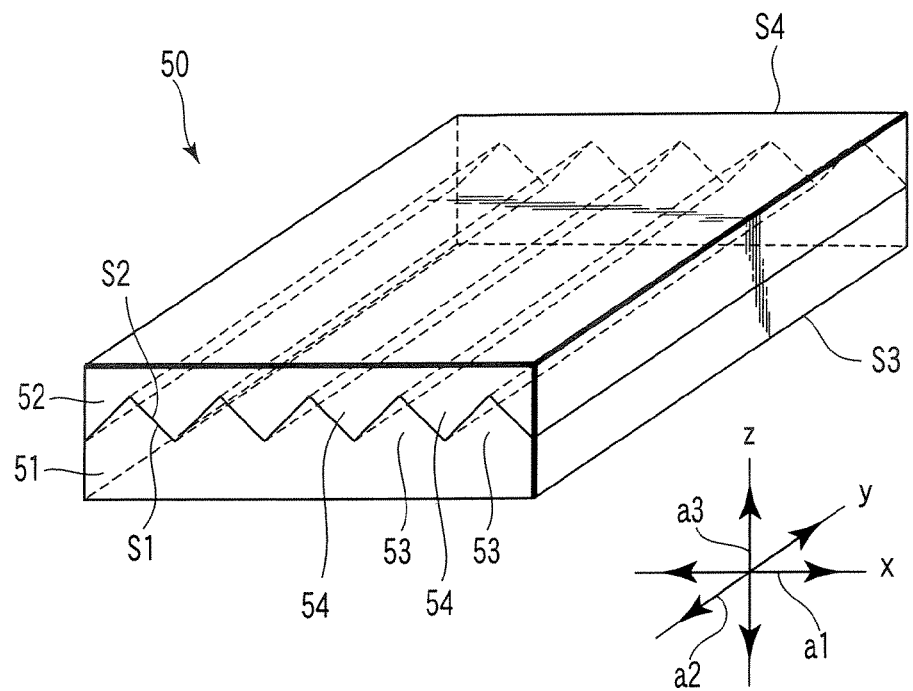
FIG. 12 is a perspective view showing an optical sheet for use in third and fourth embodiments of this invention.
Figure 13:
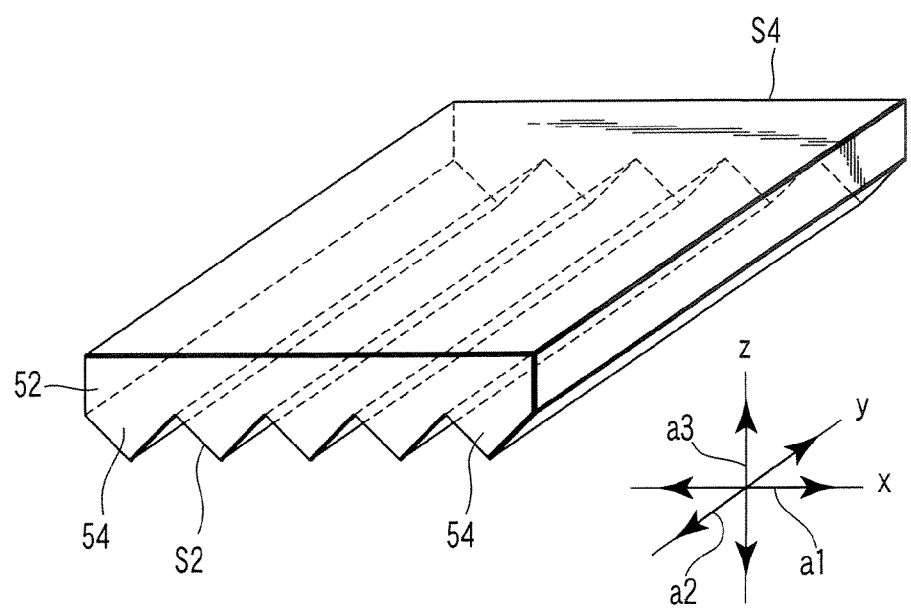
FIG. 13 is a perspective of the anisotropy medium layer shown in FIG. 12.

As shown in FIGS. 12 and 13, the optical sheet 50 has a transparent, isotropic medium layer 51 and an anisotropic medium layer 52. The anisotropic medium layer 52 contacts the isotropic medium layer 51. The isotropic medium layer 51 is made of transparent, high-molecular material, i.e., isotropic medium. The isotropic medium layer 51 has a plurality of projections 53 on a first surface S1. The projections 53 are arranged in the first direction a1 and extend parallel in the second direction a2. Each projection 53 has a triangular cross section having a substantially right-angled apex defined by two sides which have substantially the same length and which extend from the first surface S1 of the isotropic medium layer 51. The isotropic medium layer 51 has a third surface S3 that is smooth and faces away from the first surface S1. The two sides of each projection 53 incline about 45° to the third surface S3.

The anisotropic medium layer 52 is made of nematic liquid crystal polymer, which is used as refractive-index anisotropic medium that is optically positive uniaxial. Note that this polymer has been prepared by polymerizing nematic liquid crystal. The anisotropic medium layer 52 has a plurality of recesses 54 in the second surface S2 of the anisotropic medium layer 52. Each recess 54 has a substantially triangular cross section. The recesses 54 are arranged in the first direction a1 and extend parallel in the second direction a2. The cross section of each recess 54 has a substantially right-angled apex defined by two sides which have the same length and which recede from the second surface S2 of the anisotropic medium layer 52. The anisotropic medium layer 52 has a fourth surface S4 that is smooth and faces away from the second surface S2. The anisotropic medium layer 52 has an optical axis that is parallel to the second direction a2. The isotropic medium layer 51 and the anisotropic medium layer 52 are laid one on the other, with the respective projections 53 fitted in the respective recesses 54. Both outer surfaces of the optical sheet 50 are smooth. In this embodiment, the projections 53 arranged at pitch of 30 μm in the first direction a1.

The anisotropic medium layer 52 has a refractive index nx(2) in the first direction a1 and a refractive index ny(2) in the second direction a2. The refractive index nx(2) is ordinary index no, and the refractive index ny(2) is ordinary index ne. The refractive index nx(2) is given as follows:

$$n(1)=nx(2)$$

where n(1) is the refractive index of the isotropic medium layer 51.

In the present embodiment, the refractive indices n(1), nx(2) and ny(2) are 1.732, 1.732 and 1.513, respectively, with respect to light having wavelength of 550 nm.

A method of fabricating the optical sheet 50 will be described.

First, the transparent isotropic medium layer 51 is prepared. The layer 51 is made of optically isotropic transparent medium and has projections 53 formed on the first surface S1 and arranged in the first direction a1 and extending in the second direction a2. Each projection 53 has a substantially triangular cross section, which is defined by two sides which have substantially the same length and which extend from the first surface S. Next, nematic liquid crystal polymer is applied to the entire first surface S1 of the isotropic medium layer 51 thus prepared. The nematic liquid crystal polymer is in nematic phase (i.e., in the state of liquid crystal).

The anisotropic medium layer 52 is laid on the isotropic medium layer 51. The layer 52 thereby bonded to the layer 51, with the projections 53 provided on the first surface S1 of the isotropic medium layer 51 fitted in the recesses 54 of the anisotropic medium layer 52. Recall that the recesses 54 are provided in the second surface S2, are arranged in the first direction a1 and extend in the second direction a2, each having a cross section that has a substantially right-angled apex defined by two sides which have substantially the same length and which recede from the second surface S2. Needless to say, the anisotropic medium layer 52 is laid on the isotropic medium layer 51, with each recess 54 firmly holding the corresponding projection 53. The optical sheet 50 thus fabricated has a diagonal of 15 inches and an aspect ratio of 4:3.

The principle of controlling the angle of visibility of the liquid crystal display (i.e., the angle at which the backlight beam is diffused) by means of the electric-field-controlled panel 3 and first polarizing plate 4 will be explained below.

How the angle of visibility is controlled while no voltage is being applied between the transparent electrodes 81 and 83 of the liquid crystal element 80 (that is, while no electric field is being applied to the liquid crystal layer 86) will be explained first.

Figure 14:
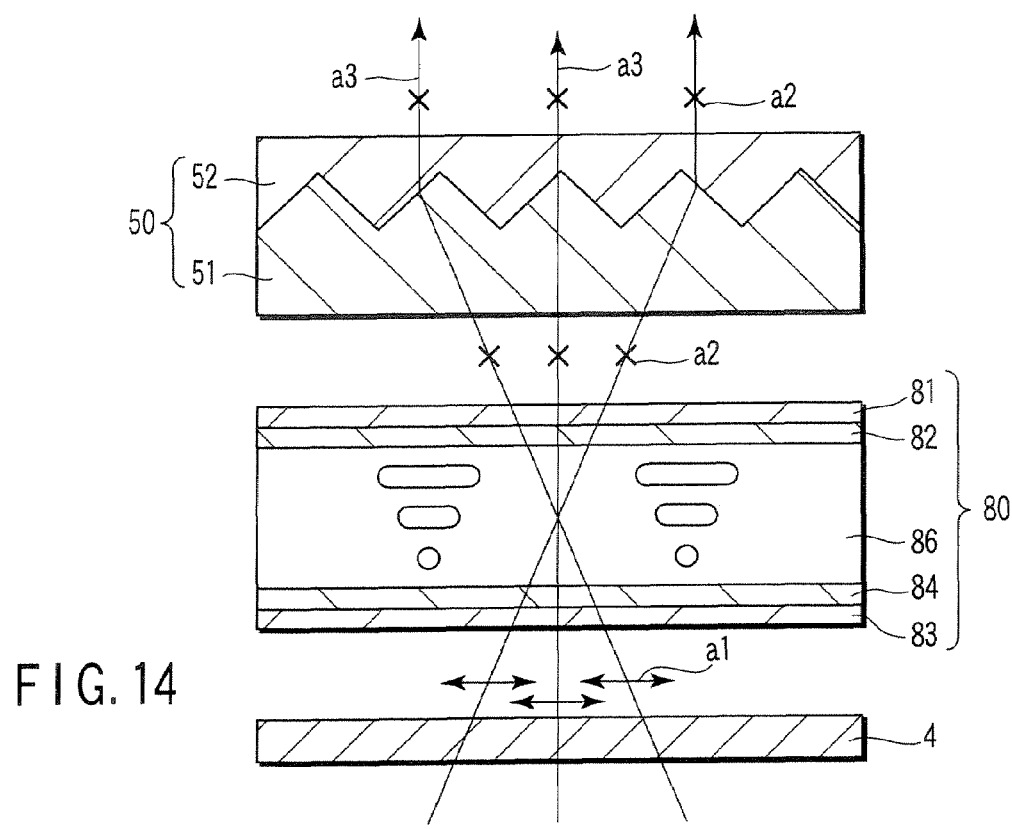
FIG. 14 is a diagram explaining the path in which backlight beams travels while no voltage is being applied to the electric-field-controlled panel used in a liquid crystal display according to the third embodiment of the invention.

As shown in FIG. 14, the first polarizer 4 receives the diffused light from the backlight unit 7 and polarizes the diffused light in the first direction a1. The light thus polarized is applied to the liquid crystal element 80. The liquid crystal element 80 changes the polarization direction of the polarized light by 90° to the second direction a2. The light thus changed in direction, i.e., light polarized in the second direction a2, is applied to the optical sheet 50. The optical sheet 50 maintains the polarized direction of the light, collimates the polarized light in the third direction a3, i.e., direction normal to the optical sheet 50, and emits the light thus collimated. That is, the light polarized in the second direction a2 and applied to the optical sheet 50 is refracted at the interface between the isotropic medium layer 51 and the anisotropic medium layer 52 and emerges in the third direction a3.

Thus, in the electric-field-controlled panel 3, the light is polarized in the second direction a2 while no voltage is being applied between the transparent electrodes 81 and 83 and the polarized light collimated in the third direction a3 is applied to the liquid crystal display panel 1.

The principle of controlling the angle of visibility while a voltage is being applied between the transparent electrodes 81 and 83 of the liquid crystal element 80 (that is, an electric field is being applied to the liquid crystal layer 86) will be explained.

Figure 15:
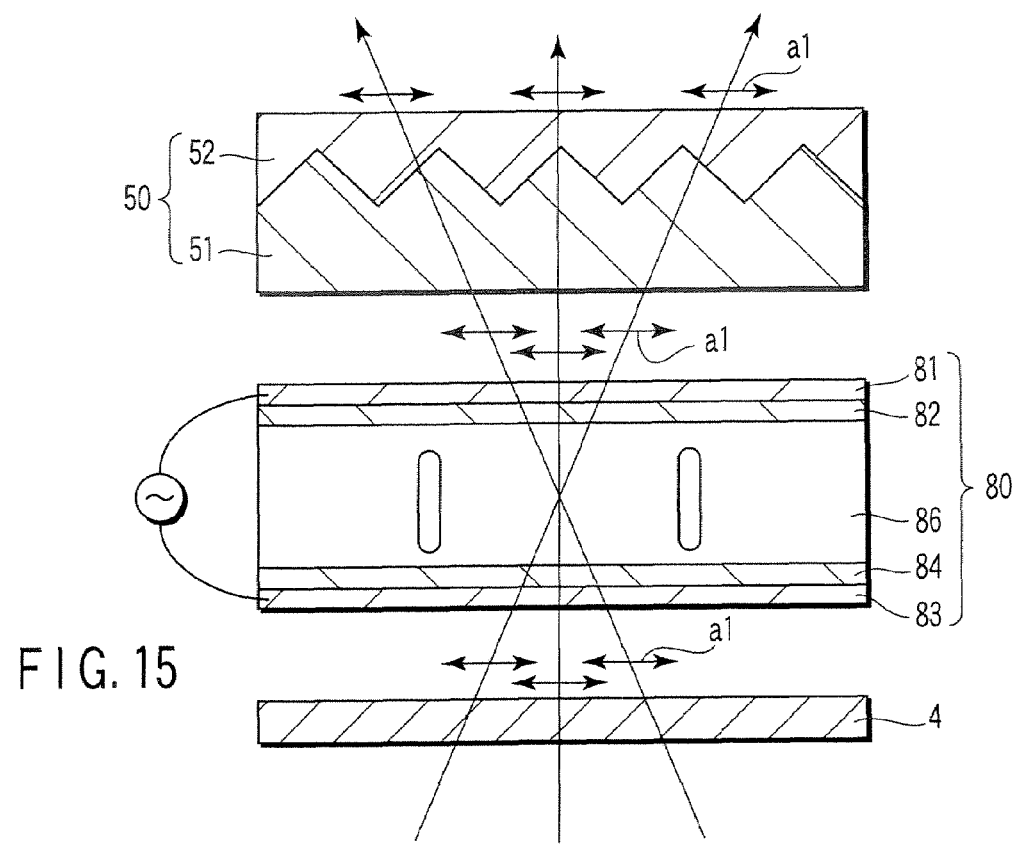
FIG. 15 is a diagram explaining the path in which backlight beams travels while a voltage is being applied to the electric-field-controlled panel used in a liquid crystal display according to the third embodiment of the invention.

As shown in FIG. 15, the first polarizer 4 receives the diffused light from the backlight unit 7 and polarizes the diffused light in the first direction a1. The light thus polarized is applied to the liquid crystal element 80. The liquid crystal element 80 receives the light polarized in the first direction a1, maintains the light polarized in the first direction a1, and supplies the light, which is polarized in the first direction a1, to the optical sheet 50. The optical sheet 50 maintains the polarized direction of the light, diffuses the light, and emit the light diffused. That is, the light polarized in the first direction a1 and applied to the optical sheet 50 travels straight in the interface between the isotropic medium layer 51 and the anisotropic medium layer 52 and emerges.

Thus, the electric-field-controlled panel 3 emits light polarized in the first direction a1 and diffused, to the liquid crystal display panel 1 while a voltage is being applied between the transparent electrodes 81 and 83.

As can be understood from the explanation of the principle of controlling the angle of visibility, the degree to which the optical sheet 50 collimates the polarized light applied to it depends upon the direction in which the light is polarized. Hence, the liquid crystal panel 1 operates in normally black mode, and its surface looks black, while no voltage is being applied between the transparent electrodes 81 and 83. While no voltage is being applied between the transparent electrodes 81 and 83, the liquid crystal panel 1 operates in normally white mode, and its surface looks white.

Hence, the display mode of the liquid crystal display panel 1 is switched, from one to the other, in accordance with whether or not a voltage is applied between the transparent electrodes 81 and 83 of the liquid crystal element 80. Therefore, to display images on the liquid crystal display, the voltage (i.e., drive voltage) applied between the pixel electrodes 12 and the common electrode 22 is inverted in accordance with whether or not a voltage is applied between the transparent electrodes 81 and 83 of the liquid crystal element 80.

The inventor thereof conducted experiments on a liquid crystal display according to the present embodiment. First, he applied no voltage between the transparent electrodes 81 and 83 of the liquid crystal element 80, causing the display to show images. Then, he applied a voltage between the transparent electrodes 81 and 83 of the liquid crystal element 80, causing the display to show images. The image displayed in the first case were compared with those displayed in the second case, in terms of luminance visual angle, contrast visual angle, front luminance and front contrast. The results were similar to those for the first embodiment.

In the optical sheet 50 and the liquid crystal display described above, the electric-field-controlled panel 3 is provided between the liquid crystal display panel 1 and the backlight unit 7. The electric-field-controlled panel 3 has the optical sheet 50 (FIGS. 12 and 13) and the liquid crystal element 80 (FIG. 14).

As indicated above, the optical sheet 50 has the isotropic medium layer 51 and the anisotropic medium layer 52. The isotropic medium layer 51 is made of optically isotropic material and has a plurality of projections 53 on the first surface S1, each projection 53 having a substantially triangular cross section. The anisotropic medium layer 52 is made of optically uniaxial medium and has a plurality of recesses 54 in the surface S2, each recess having a substantially triangular cross section.

The projections 53 and the recesses 54 are arranged in the first direction a1 and extend in the second direction a2. Each projection 53 has a cross section that has a substantially right-angled apex defined by two sides which have substantially the same length and which extend from the first surface S1. Each recess 54 has a cross section that has a substantially right-angled apex defined by two sides which have substantially the same length and which recede from the second surface S2. The anisotropic medium layer 52 is laid on the isotropic medium layer 51, with each recess 54 firmly holding the corresponding projection 53. The isotropic medium layer 51 has a refractive index $n(1)$ that is equal to the refractive index $nx(2)$ that the anisotropic medium layer 52 has with respect to the first direction a1.

The liquid crystal element 80 is of TN type, having the first transparent electrode 81, alignment film 82, second transparent electrode 83, alignment film 84 and liquid crystal layer 86. The first transparent electrode 81 and the alignment film 82 are provided on the isotropic medium layer 51. The second transparent electrode 83 and the alignment film 84 are provided on the transparent substrate 60.

The display mode of the liquid crystal display panel 1 is changed, from one to the other, in accordance with whether or not a voltage is applied between the transparent electrodes 81 and 83. Thus, the liquid crystal element 80 receives light polarized in the first direction a1 and emits the light in the first direction or the light polarized in the second direction a2. The optical sheet 50 receives from the liquid crystal element 80 the light polarized in the first direction a1, maintains the polarized direction of the light, diffuses the light, and emits the light diffused. The optical sheet 50 may receive, from the liquid crystal element 80, light polarized in the second direction a2, may maintain the polarized direction of the light, may collimate the light in the third direction a3, and emits the light collimated. Thus, the optical sheet 50 can controls the direction in which the polarized light applied to it travels.

To display images at a small angle of visibility, no voltage is applied between the transparent electrodes 81 and 83 of the liquid crystal element 80. To display images at a large angle of visibility, a voltage may be applied between the transparent electrodes 81 and 83 of the liquid crystal element 80. Thus, the angle of visibility can be easily controlled, merely by operating a switch (not shown) or a dial (not shown) provided on the liquid crystal display.

Assume that this liquid crystal display is mounted on a mobile PC, a cellular telephone, a PDA, an electronic pocket diary, a tablet PC, or the like, which may be used in public. The angle of visibility may be reduced if the information displayed should be concealed from anyone but the user. In this case, the user need not worry about someone else's access to the information. By contrast, the angle of visibility may be increased if the information displayed should be disclosed not only to the user, but also to some other persons. In this manner, the trouble that displayed contents are undesirably monitored can be avoided. Further, if desired, more than one person can monitor the displayed image at the same time easily.

As described above, the projections 53 arranged at pitch of 30 μm in the first direction a1. Therefore, the light (i.e., backlight or external light) is scarcely diffracted at the optical sheet 50. The pattern of the recesses 54 of the anisotropic medium layer 52 (and the projections 53 of the isotropic medium layer 51) cannot be seen to the naked eye. Hence, the use of the optical sheet 50 would not impair the quality of images displayed. The advantage mentioned above can be achieved only if the centers c of the recesses 54 are arranged at pitch of 10 μm to 70 μm.

An optical sheet and a liquid crystal display having the optical sheet, both according to a fourth embodiment of the invention, will be described. In this embodiment, the liquid crystal display panel 1 and the lighting apparatus 2 are similar in configuration to the liquid crystal panel and the lighting apparatus, both described above. The components identical to those of the second embodiment are designated at the same reference numbers and will not be described in detail.

The optical sheet 50 of this embodiment is formed in the same way as the optical sheet of the third embodiment. That is, it is has the configuration shown in FIGS. 12 and 13.

The optical sheet 50 of this embodiment differs in configuration from the optical sheet of the second embodiment. Nonetheless, the liquid crystal display according to this embodiment is manufactured in the same method as the display according to the second embodiment except for method of manufacturing the optical sheet.

The principle of controlling the angle of visibility of the liquid crystal display (i.e., the angle at which the backlight beam is diffused) by means of the electric-field-controlled panel 3 and first polarizer 4 will be explained below.

How the angle of visibility is controlled while no voltage is being applied between the first and second transparent electrodes 81 and 83 of each liquid crystal element 80 (that is, while no electric field is being applied to the liquid crystal layer 86) will be explained first.

Figure 16:
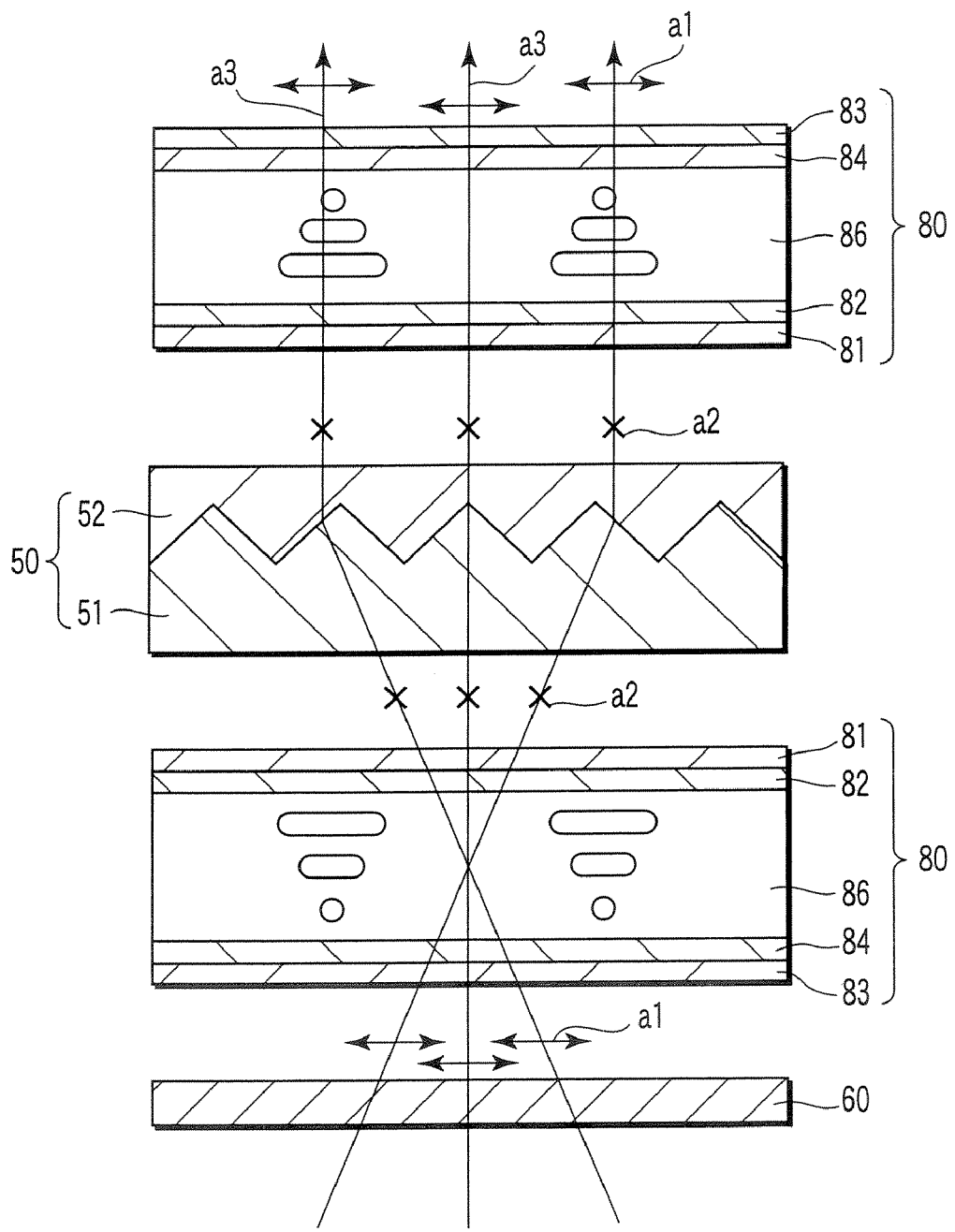
FIG. 16 is a diagram explaining the path in which backlight beams travels while no voltage is being applied to the electric-field-controlled panel used in a liquid crystal display according to the fourth embodiment of the invention.

As shown in FIG. 16, the first polarizer 4 receives the diffused light from the backlight unit 7 and polarizes the light in the first direction a1. The light thus polarized is applied to the liquid crystal element 80 that is provided at the isotropic medium layer 51. The liquid crystal element 80 located at the isotropic medium layer 51 changes the polarization direction of the polarized light by 90° to the second direction a2. The light thus changed in direction, i.e., light polarized in the second direction a2, is applied to the optical sheet 50.

The optical sheet 50 maintains the polarized direction of the light, collimates the polarized light in the third direction a3, i.e., direction normal to the optical sheet 50, and emits the light thus collimated. That is, the light polarized in the second direction a2 and applied to the optical sheet 50 is refracted at the interface between the isotropic medium layer 51 and the anisotropic medium layer 52 and emerges in the third direction a3.

The liquid crystal element 80 that is provided at the anisotropic medium layer 52 receives the collimated, polarized light from the optical sheet 50, changes the polarization direction of this polarized light by 90° to the first direction a1 and collimates this light in the third direction a3. The light thus collimated is emitted from the liquid crystal element 80.

Thus, the electric-field-controlled panel 3 polarizes light in the first direction a1 and emits polarized light collimated in the third direction a3 to the liquid crystal display panel 1, while no voltage is being applied between each first transparent electrode 81 and the second transparent electrode 83 associated therewith.

The principle of controlling the angle of visibility while a voltage is being applied between each first transparent electrode 81 and the second transparent electrode 83 associated therewith (that is, an electric field is being applied to the liquid crystal layer 86) will be explained.

Figure 17:
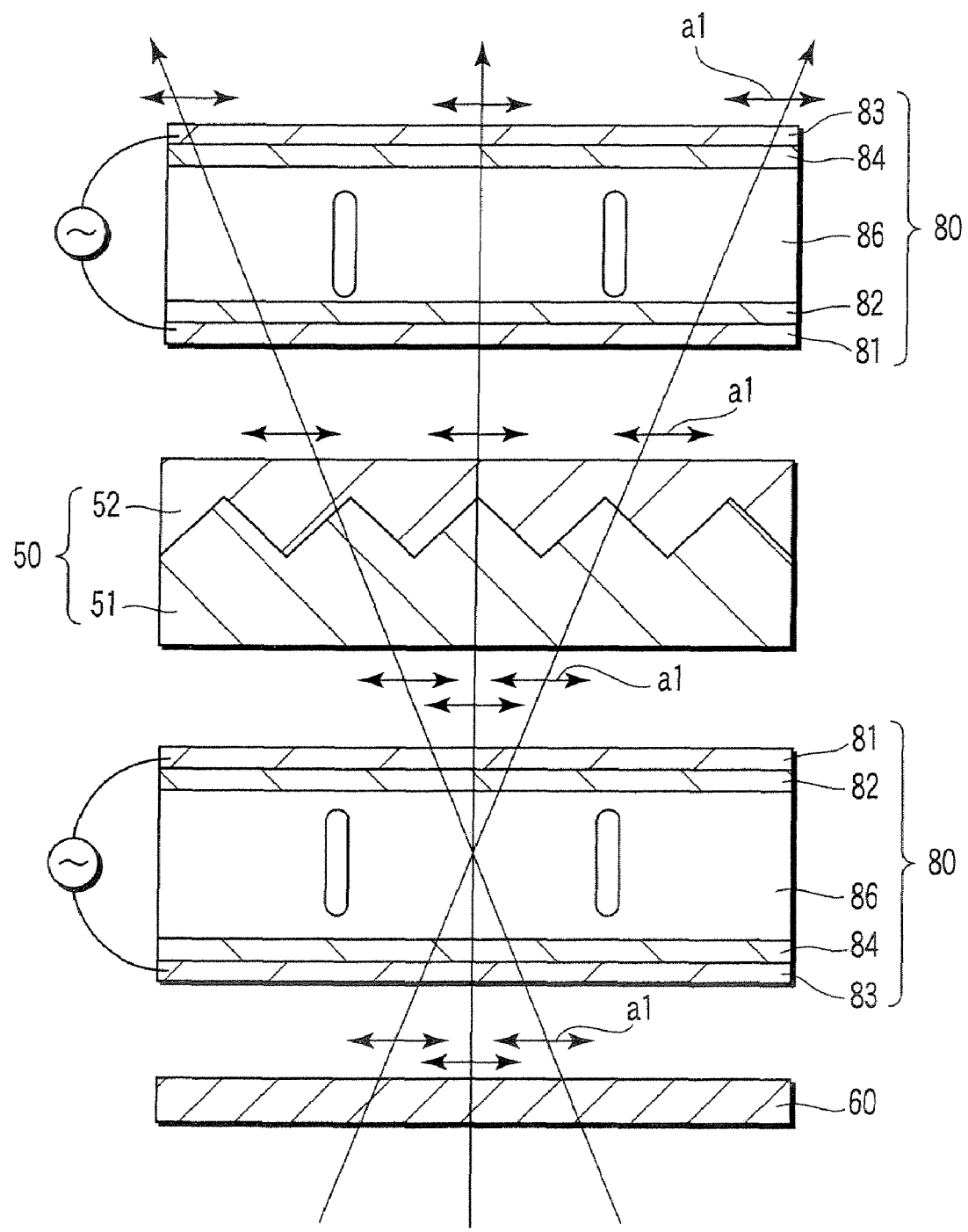
FIG. 17 is a diagram explaining the path in which backlight beams travels while a voltage is being applied to the electric-field-controlled panel used in a liquid crystal display according to the fourth embodiment of the invention.

As shown in FIG. 17, the first polarizer 4 receives the diffused light from the backlight unit 7 and polarizes the diffused light in the first direction a1. The light thus polarized is applied to the liquid crystal element 80 located at the isotropic medium layer 51. The liquid crystal element 80 located at the layer 51 maintains the light polarized in the first direction a1, and supplies the light, which remains polarized in the first direction a1, to the optical sheet 50.

The optical sheet 50 receives the light polarized in the first direction a1, maintains the polarized direction of this light, diffuses the light, and emits the light diffused. That is, the light polarized in the first direction a1 and applied to the optical sheet 50 travels straight in the interface between the isotropic medium layer 51 and the anisotropic medium layer 52 and emerges.

Thus, the liquid crystal element 80 located at the anisotropic medium layer 52 receives the light polarized in first direction a1 and emitted from the optical sheet 50, maintains the light polarized in the direction a1, diffuses this light, and emits the light diffused.

As can be understood from the above, the electric-field-controlled panel 3 emits to the liquid crystal display panel 1 the diffused light polarized in the first direction a1, while a voltage is being applied between each first transparent electrode 81 and the second transparent electrode 83 associated therewith.

As can be seen from the explanation of the principle of controlling the angle of visibility, the degree to which the optical sheet 50 collimates the polarized light applied to it depends upon the direction in which the light is polarized. Hence, the liquid crystal panel 1 operates in normally white mode and its surface looks white, while no voltage is being applied between the pixel electrodes 12 and the common electrode 22, no matter whether a voltage is applied between the transparent electrodes 81 and 83 of each liquid crystal element 80.

Namely, the display mode of the liquid crystal display panel 1 remains unchanged, no matter whether a voltage is applied between the transparent electrodes 81 and 83 of each liquid crystal element 80. Hence, the voltage (drive voltage) to be applied between the pixel electrodes 12 and common electrode 83 of each liquid crystal display panel 1 need not be changed in accordance with whether a voltage is applied between the transparent electrodes 81 and 83 of each liquid crystal element 80.

The inventor thereof conducted experiments on a liquid crystal display according to the present embodiment. First, he applied no voltage between the transparent electrodes 81 and 83 of each liquid crystal element 80, causing the display to show images. Then, he applied a voltage between the transparent electrodes 81 and 83 of the liquid crystal element 80, causing the display to show images. The image displayed in the first case were compared with those displayed in the second case, in terms of luminance visual angle, contrast visual angle, front luminance and front contrast. The results were similar to those for the second embodiment.

In the optical sheet 50 and the liquid crystal display configured as described above, the electric-field-controlled panel 3 is interposed between the liquid crystal display panel 1 and the backlight unit 7. The electric-field-controlled panel 3 has a pair of liquid crystal elements 80, one on one side of the optical sheet 50, and the other at the other side thereof. Each liquid crystal element 80 is of the TN type, having the first transparent electrode 81, alignment film 82, second transparent electrode 83, alignment film 84 and liquid crystal layer 86.

The operating state is switched, from one state in which a voltage is applied between the first transparent electrode 81 and the second transparent electrode 83, to the other state in which no voltage is applied between these transparent electrodes 81 and 83, or vice versa, the liquid crystal element 80 located at the isotropic medium layer 51 emits the light polarized in the first direction a1 it has received, as light polarized in the first direction a1 or the second direction a2.

The optical sheet 50 receives the light polarized in the first direction a1, from the liquid crystal element 80 located at the isotropic medium layer 51, maintains the polarized direction of this light, diffuses the light, and emits the light diffused. Further, the optical sheet 50 receives the light polarized in the second direction a2, from the liquid crystal element 80 located at the isotropic medium layer 51, maintains the polarized direction of this light, collimates the light in the third direction a3, and emits the light collimated. Hence, the optical sheet 50 can control the direction in which the polarized light applied to it travels.

The liquid crystal element 80 located at the anisotropic medium layer 52 receives the light polarized in the first direction a1 from the optical sheet 50, maintains the light polarized in the first direction a1, diffuses this light, and emits the light diffused. The liquid crystal element 80 receives light collimated in the third direction a3, from the optical sheet 50, polarizes the light in the first direction, and collimates the light in the third direction a3, and emits the light thus collimated.

To display images at a small angle of visibility, no voltage may be applied between the transparent electrodes 81 and 83 of each liquid crystal element 80. To display images at a large angle of visibility, a voltage may be applied between the transparent electrodes 81 and 83 of each liquid crystal element 80. Thus, the angle of visibility of the liquid crystal display can be easily controlled, merely by operating a switch (not shown) or a dial (not shown) provided on the liquid crystal display.

Assume that this liquid crystal display is mounted on a mobile PC, a cellular telephone, a PDA, an electronic pocket diary, a tablet PC, or the like, which may be used in public. The angle of visibility may be reduced if the information displayed should be concealed from anyone but the user. In this case, the user need not worry about someone else's access to the information. By contrast, the angle of visibility may be increased if the information displayed should be disclosed not only to the user, but also to some other persons. In this manner, the trouble that displayed contents are undesirably monitored can be avoided. Further, if desired, more than one person can monitor the displayed image at the same time easily.

The two liquid crystal elements 80 are of the TN type. The liquid crystal molecules facing the alignment film 82 of the liquid crystal element 80 located at the isotropic medium layer 51 are twisted in the direction opposite to the direction to the liquid crystal molecules facing the alignment film of the liquid crystal element located at the anisotropic medium layer 52. Therefore, the electric-field-controlled panel 3 can maintain the light polarized in the same direction and emits the light, regardless of the wavelength of the light.

The liquid crystal elements 80 need not be of NT type. They may be of the ECB type. If they are of the ECB type, the liquid crystal molecules facing the alignment film 82 of the liquid crystal element 80 located at the isotropic medium layer 51 have major axes that intersect, at right angles, with the major axes of the liquid crystal molecules facing the alignment film of the liquid crystal element located at the anisotropic medium layer 52. Each liquid crystal element 80 shifts the phase of the coming polarized light by half the wavelength of the light. The electric-field-controlled panel 3 can therefore emits light whose phase is identical to that of the light it has received.

The third polarizer 6 is interposed between the electric-field-controlled panel 3 and the array substrate 10. The polarizer 6 has a transmission axis that is parallel to the first direction a1. The first third polarizer 6 can therefore further polarize the polarized light applied to the liquid crystal display panel 1. Thus, the liquid crystal display can be obtained high contrast. The liquid crystal display may not have the third polarizer 6. Having the third polarizer 6, the liquid crystal display achieves higher image contrast than the case where the polarizer 6 is not used.

Thus, this invention can provide a liquid crystal display in which the decrease in luminance can be suppressed and the angle of visibility can be controlled to any desired value.

The present invention is not limited to the embodiments described above. The components of any embodiment can be modified in various manners in reducing the invention to practice, without departing from the spirit or scope of the invention. Further, the components of any embodiment described above may be combined, if necessary, in various ways to make different inventions. For example, some of the component of any embodiment may not be used. Moreover, the components of the different embodiments may be combined in any desired fashion.

For example, the first transparent electrodes 81 of the liquid crystal element 80 may be formed on a transparent substrate such as a glass plate, though it is formed on the optical sheet 50 in the embodiments in order to render the liquid crystal display thin. The electrodes 81 only need to be opposed to the optical sheet 50. The liquid crystal display panel 1 is not limited to a transmission type, so long as it is of the type that displays images by using the light emitted from the backlight unit 7. The optical sheet 50 attains the same advantage even if the isotropic medium layer 51 and the anisotropic medium layer 52 exchange their positions. In this case, the isotropic medium layer 51 faces the array substrate 10, whereas the anisotropic medium layer 52 faces the backlight unit 7. In the optical sheet 50, the medium layers 51 and 52 only needs to have the same refractive index (i.e., n(1)=n(2)). To light having wavelength of 550 nm, for example, the refractive indices n(1), nx(2) and ny(2) may be 1.513, 1.513 and 1.732, respectively.

What is claimed is:

1. An optical sheet comprising:

an isotropic medium layer which is made of an optically isotropic medium and which has a first surface, a plurality of ridge-shaped projections formed on the first surface, arranged in a first direction and extending in a second direction intersecting at right angles to the first direction, and a third surface being smooth and opposed to the first surface, each of the projections having a cross section shaped like a segment of a circle; and an anisotropic medium layer which is made of an optically uniaxial medium and which has a second surface, and a plurality of groove-shaped recesses made in the second surface, arranged in the first direction and extending in the second direction, and a fourth surface being smooth and opposed to the second surface, each of the recesses having a cross section shaped like a segment of a circle;

the isotropic medium layer and the anisotropic medium layer being laid one on the other, with the respective projections firmly fitted in the respective recesses, and the isotropic medium layer having a refractive index equal to a refractive index of the anisotropic medium layer in the first direction.

2. The optical sheet according to claim 1, which receives light polarized in the first direction, maintains the light polarized in the first direction, diffuses the light and emits the light diffused, and receives light polarized in the second direction, maintains the light polarized in the second direction, collimates the light in a direction normal to the optical sheet and emits the light.

3. The optical sheet according to claim 1, wherein the centers of the recesses are arranged at pitch of 20 μm to 70 μm.

4. The optical sheet according to claim 1, wherein the anisotropic medium layer is made of nematic liquid crystal or material prepared by polymerizing nematic liquid crystal.

5. An optical sheet comprising:

an isotropic medium layer which is made of an optically isotropic medium and which has a first surface, a plurality of ridge-shaped projections formed on the first surface, and a third surface being smooth and opposed to the first surface, each of the projections having a substantially triangular cross section; and an anisotropic medium layer which is made of an optically uniaxial medium and which has a second surface, a plurality of groove-shaped recesses made in the second surface, and a fourth surface being smooth and opposed to the second surface, each of the recesses having a substantially triangular cross section;

the projections and the recesses being arranged in a first direction and extending in a second direction, the cross section of each of the projections having a substantially right-angled apex defined by two sides which have substantially the same length and which extend from the first surface, and the cross section of each of the recesses having a substantially right-angled apex defined by two sides which have substantially the same length and which recede from the second surface, the first and second directions being in planes of the isotropic and anisotropic medium layers and intersecting with each other at right angles, the isotropic medium layer and the anisotropic medium layer being laid one on the other, with the respective projections firmly fitted in the respective recesses, the isotropic medium layer having a refractive index equal to a refractive index which the anisotropic medium layer has with respect to the first direction, and the optical sheet being configured to receive light polarized in the first direction, maintain the light polarized in the first direction, diffuse the light and emit the light diffused, and to receive light polarized in the second direction, maintain the light polarized in the second direction, collimate the light in a direction normal to the optical sheet and emit the light.

6. An electric-field-controlled panel comprising:

an optical sheet which has an isotropic medium layer and an anisotropic medium layer, the isotropic medium layer being made of an optically isotropic medium and having a first surface and a plurality of ridge-shaped projections which are formed on the first surface, which are arranged in a first direction and which extend in a second direction intersecting at right angles to the first direction, each of the projections having a cross section shaped like a segment of a circle, the anisotropic medium layer being made of an optically uniaxial medium and having a second surface and a plurality of groove-shaped recesses which are made in the second surface, which are arranged in the first direction and which extend in the second direction, each of the recesses having a cross section shaped like a segment of a circle, and the isotropic medium layer and the anisotropic medium layer being laid one on the other, with the respective projections firmly fitted in the respective recesses; and a liquid crystal display element which has a first transparent electrode facing the optical sheet and located at the isotropic medium layer, a first alignment film formed on the first transparent electrode, a second transparent electrode, and a second alignment film formed on the second transparent electrode, and a liquid crystal layer interposed between the first and second alignment films, the liquid crystal element being configured to receive polarized light and emit the light as light polarized in the first direction while a voltage is being applied between the first transparent electrode and the second transparent electrode, and to receive polarized light and emit the light as light polarized in the second direction while no voltage is being applied between the first transparent electrode and the second transparent electrode, and the optical sheet being configured to receive, from the liquid crystal element, light polarized in the first direction, maintain the light polarized in the first direction, diffuse the light and emit the light diffused, and to receive, from the liquid crystal element, light polarized in the second direction, maintain the light polarized in the second direction, collimate the light in a direction normal to the optical sheet and emit the light.

7. An electric-field-controlled panel comprising:

an optical sheet which has an isotropic medium layer and an anisotropic medium layer, the isotropic medium layer being made of an optically isotropic medium and having a first surface and a plurality of ridge-shaped projections which are formed on the first surface, which are arranged in a first direction and which extend in a second direction intersecting at right angles to the first direction, each of the projections having a cross section shaped like a segment of a circle, the anisotropic medium layer being made of an optically uniaxial medium and having a second surface and a plurality of groove-shaped recesses which are made in the second surface, which are arranged in the first direction and which extend in the second direction, each of the recesses having a cross section shaped like a segment of a circle, and the isotropic medium layer and the anisotropic medium layer being laid one on the other, with the respective projections firmly fitted in the respective recesses; and a pair of liquid crystal elements which are provided on sides of the optical sheet, respectively, and each of which has a first transparent electrode facing the optical sheet, a first alignment film formed on the first transparent electrode, a second transparent electrode, and a second alignment film formed on the second transparent electrode, and a liquid crystal layer interposed between the first and second alignment films, the liquid crystal element located at the isotropic medium layer being configured to receive polarized light and emit the light as light polarized in the first direction while a voltage is being applied between the first transparent electrode and the second transparent electrode, and to receive polarized light and emit the light as light polarized in the second direction while no voltage is being applied between the first transparent electrode and the second transparent electrode, the optical sheet being configured to receive, from the liquid crystal element located at the isotropic medium layer, light polarized in the first direction, maintain the light polarized in the first direction, diffuse the light and emit the light diffused, and to receive, from the liquid crystal element located at the isotropic medium layer, light polarized in the second direction, maintain the light polarized in the second direction, collimate the light in a direction normal to the optical sheet and emit the light, and the liquid crystal element located at the anisotropic medium layer being configured to receive, from the optical sheet, light polarized in the first direction, maintain the light polarized in the first direction, diffuses the light and emits the light, while a voltage is being applied between the first transparent electrode and the second transparent electrode, and to receive collimated light from the optical sheet, change the light to light polarized in the first direction, collimates the light in the direction normal to the optical sheet and emits the light, while no voltage is being applied between the first transparent electrode and the second transparent electrode.

8. An electric-field-controlled panel comprising:

an optical sheet having an isotropic medium layer which is made of an optically isotropic medium and which has a first surface and a plurality of ridge-shaped projections formed on the first surface, each of the projections having a substantially triangular cross section; and an anisotropic medium layer which is made of an optically uniaxial medium and which has a second surface and a plurality of groove-shaped recesses made in the second surface, each of the recesses having a substantially triangular cross section, the projections and the recesses being arranged in a first direction and extending in a second direction, the first and second directions being in planes of the isotropic and anisotropic medium layers and intersecting with each other at right angles, the cross section of each of the projections having a substantially right-angled apex defined by two sides which have substantially the same length and which extend from the first surface, and the cross section of each of the recesses having a substantially right-angled apex defined by two sides which have substantially the same length and which recede from the second surface, and the isotropic medium layer and the anisotropic medium layer being laid one on the other, with the respective projections firmly fitted in the respective recesses; and a liquid crystal display element which has a first transparent electrode facing the optical sheet and located at the isotropic medium layer, a first alignment film formed on the first transparent electrode, a second transparent electrode, and a second alignment film formed on the second transparent electrode, and a liquid crystal layer interposed between the first and second alignment films, the liquid crystal element being configured to receive polarized light and emit the light as light polarized in the first direction while a voltage is being applied between the first transparent electrode and the second transparent electrode, and to receive polarized light and emit the light as light polarized in the second direction while no voltage is being applied between the first transparent electrode and the second transparent electrode, and the optical sheet being configured to receive, from the liquid crystal element, light polarized in the first direction, maintain the light polarized in the first direction, diffuse the light and emit the light diffused, and to receive, from the liquid crystal element, light polarized in the second direction, maintain the light polarized in the second direction, collimate the light in a direction normal to the optical sheet and emit the light.

9. An electric-field-controlled panel comprising:

an optical sheet having an isotropic medium layer which is made of an optically isotropic medium and which has a first surface and a plurality of ridge-shaped projections formed on the first surface, each of the projections having a substantially triangular cross section; and an anisotropic medium layer which is made of an optically uniaxial medium and which has a second surface and a plurality of groove-shaped recesses made in the second surface, each of the recesses having a substantially triangular cross section, the projections and the recesses being arranged in a first direction and extending in a second direction, the first and second directions being in planes of the isotropic and anisotropic medium layers and intersecting with each other at right angles, the cross section of each of the projections having a substantially right-angled apex defined by two sides which have substantially the same length and which extend from the first surface, and the cross section of each of the recesses having a substantially right-angled apex defined by two sides which have substantially the same length and which recede from the second surface, and the isotropic medium layer and the anisotropic medium layer being laid one on the other, with the respective projections firmly fitted in the respective recesses; and a liquid crystal display element which has a first transparent electrode facing the optical sheet and located at the anisotropic medium layer, a first alignment film formed on the first transparent electrode, a second transparent electrode, and a second alignment film formed on the second transparent electrode, and a liquid crystal layer interposed between the first and second alignment films, the liquid crystal element being configured to receive polarized light and emit the light as light polarized in the first direction while a voltage is being applied between the first transparent electrode and the second transparent electrode, and to receive polarized light and emit the light as light polarized in the second direction while no voltage is being applied between the first transparent electrode and the second transparent electrode, and the optical sheet being configured to receive, from the liquid crystal element, light polarized in the first direction, maintain the light polarized in the first direction, diffuse the light and emit the light diffused, and to receive, from the liquid crystal element, light polarized in the second direction, maintain the light polarized in the second direction, collimate the light in a direction normal to the optical sheet and emit the light.

10. An electric-field-controlled panel comprising:

an optical sheet having an isotropic medium layer which is made of an optically isotropic medium and which has a first surface and a plurality of ridge-shaped projections formed on the first surface, each of the projections having a substantially triangular cross section; and an anisotropic medium layer which is made of an optically uniaxial medium and which has a second surface and a plurality of groove-shaped recesses made in the second surface, each of the recesses having a substantially triangular cross section, the projections and the recesses being arranged in a first direction and extending in a second direction, the first and second directions being in planes of the isotropic and anisotropic medium layers and intersecting with each other at right angles, the cross section of each of the projections having a substantially right-angled apex defined by two sides which have substantially the same length and which extend from the first surface, and the cross section of each of the recesses having a substantially right-angled apex defined by two sides which have substantially the same length and which recede from the second surface, and the isotropic medium layer and the anisotropic medium layer being laid one on the other, with the respective projections firmly fitted in the respective recesses; and a pair of liquid crystal elements which are provided on sides of the optical sheet, respectively, and each of which has a first transparent electrode facing the optical sheet, a first alignment film formed on the first transparent electrode, a second transparent electrode, and a second alignment film formed on the second transparent electrode, and a liquid crystal layer interposed between the first and second alignment films, and the liquid crystal element located at the isotropic medium layer being configured to receive polarized light and emit the light as light polarized in the first direction while a voltage is being applied between the first transparent electrode and the second transparent electrode, and to receive polarized light and emit the light as light polarized in the second direction while no voltage is being applied between the first transparent electrode and the second transparent electrode, the optical sheet being configured to receive, from the liquid crystal element located at the isotropic medium layer, light polarized in the first direction, maintain the light polarized in the first direction, diffuse the light and emit the light diffused, and to receive, from the liquid crystal element located at the isotropic medium layer, light polarized in the second direction, maintain the light polarized in the second direction, collimate the light in a direction normal to the optical sheet and emit the light, and the liquid crystal element located at the anisotropic medium layer being configured to receive, from the optical sheet, light polarized in the first direction, maintain the light polarized in the first direction, diffuses the light and emits the light, while a voltage is being applied between the first transparent electrode and the second transparent electrode, and to receive collimated light from the optical sheet, change the light to light polarized in the first direction, collimates the light in the direction normal to the optical sheet and emits the light, while no voltage is being applied between the first transparent electrode and the second transparent electrode.

11. An electric-field-controlled panel comprising:

an optical sheet having an isotropic medium layer which is made of an optically isotropic medium and which has a first surface and a plurality of ridge-shaped projections formed on the first surface, each of the projections having a substantially triangular cross section; and an anisotropic medium layer which is made of an optically uniaxial medium and which has a second surface and a plurality of groove-shaped recesses made in the second surface, each of the recesses having a substantially triangular cross section, the projections and the recesses being arranged in a first direction and extending in a second direction, the first and second directions being in planes of the isotropic and anisotropic medium layers and intersecting with each other at right angles, the cross section of each of the projections having a substantially right-angled apex defined by two sides which have substantially the same length and which extend from the first surface, and the cross section of each of the recesses having a substantially right-angled apex defined by two sides which have substantially the same length and which recede from the second surface, and the isotropic medium layer and the anisotropic medium layer being laid one on the other, with the respective projections firmly fitted in the respective recesses; and a pair of liquid crystal elements which are provided on sides of the optical sheet, respectively, and each of which has a first transparent electrode facing the optical sheet, a first alignment film formed on the first transparent electrode, a second transparent electrode, and a second alignment film formed on the second transparent electrode, and a liquid crystal layer interposed between the first and second alignment films, and the liquid crystal element located at the anisotropic medium layer being configured to receive polarized light and emit the light as light polarized in the first direction while a voltage is being applied between the first transparent electrode and the second transparent electrode, and to receive polarized light and emit the light as light polarized in the second direction while no voltage is being applied between the first transparent electrode and the second transparent electrode, the optical sheet being configured to receive, from the liquid crystal element located at the anisotropic medium layer, light polarized in the first direction, maintain the light polarized in the first direction, diffuse the light and emit the light diffused, and to receive, from the liquid crystal element located at the anisotropic medium layer, light polarized in the second direction, maintain the light polarized in the second direction, collimate the light in a direction normal to the optical sheet and emit the light, and the liquid crystal element located at the isotropic medium layer being configured to receive, from the optical sheet, light polarized in the first direction, maintain the light polarized in the first direction, diffuses the light and emits the light, while a voltage is being applied between the first transparent electrode and the second transparent electrode, and to receive collimated light from the optical sheet, change the light to light polarized in the first direction, collimates the light in the direction normal to the optical sheet and emits the light, while no voltage is being applied between the first transparent electrode and the second transparent electrode.

12. A lighting apparatus comprising:

an optical sheet which has an isotropic medium layer and an anisotropic medium layer, the isotropic medium layer being made of an optically isotropic medium and having a first surface and a plurality of ridge-shaped projections which are formed on the first surface, which are arranged in a first direction and which extend in a second direction intersecting at right angles to the first direction, each of the projections having a cross section shaped like a segment of a circle; the anisotropic medium layer being made of an optically uniaxial medium and having a second surface and a plurality of groove-shaped recesses which are made in the second surface, which are arranged in the first direction and which extend in the second direction, each of the recesses having a cross section shaped like a segment of a circle, and the isotropic medium layer and the anisotropic medium layer being laid one on the other, with the respective projections firmly fitted in the respective recesses;

a liquid crystal element which faces the optical sheet and which is located at the isotropic medium layer;

a backlight unit which faces the liquid crystal element; and a polarizer which is interposed between the liquid crystal element and the backlight unit, the backlight unit being configured to emit diffused light, the polarizer having a transmission axis that is parallel to the first direction, the liquid crystal element being configured to receive light polarized in the first direction and emits the light as light polarized in the first direction or the second direction, and the optical sheet being configured to receive, from the liquid crystal element, light polarized in the first direction, maintain the light polarized in the first direction, diffuse the light and emit the light diffused, and to receive, from the liquid crystal element, light polarized in the second direction, maintain the light polarized in the second direction, collimate the light in a direction normal to the optical sheet and emit the light.

13. A lighting apparatus comprising:

an optical sheet which has an isotropic medium layer and an anisotropic medium layer, the isotropic medium layer being made of an optically isotropic medium and having a first surface and a plurality of ridge-shaped projections which are formed on the first surface, which are arranged in a first direction and which extend in a second direction intersecting at right angles to the first direction, each of the projections having a cross section shaped like a segment of a circle; the anisotropic medium layer being made of an optically uniaxial medium and having a second surface and a plurality of groove-shaped recesses which are made in the second surface, which are arranged in the first direction and which extend in the second direction, each of the recesses having a cross section shaped like a segment of a circle, and the isotropic medium layer and the anisotropic medium layer being laid one on the other, with the respective projections firmly fitted in the respective recesses;

a pair of liquid crystal elements provide on sides of the optical sheet, respectively;

a backlight unit which faces the liquid crystal element located at the isotropic medium layer; and a polarizer which is interposed between the liquid crystal element located at the isotropic medium layer and the backlight unit, the backlight unit being configured to emit diffused light, the polarizer having a transmission axis that is parallel to the first direction, the liquid crystal element located at the isotropic medium layer being configured to receive light polarized in the first direction and emits the light as light polarized in the first direction or the second direction, the optical sheet being configured to receive, from the liquid crystal element located at the isotropic medium layer, light polarized in the first direction, maintain the light polarized in the first direction, diffuse the light and emit the light diffused, and to receive, from the liquid crystal element located at the isotropic medium layer, light polarized in the second direction, maintain the light polarized in the second direction, collimate the light in a direction normal to the optical sheet and emit the light, and the liquid crystal element located at the anisotropic medium layer being configured to receive, from the optical sheet, light polarized in the first direction, maintain the light polarized in the first direction, diffuse the light and emits the light, and to receive, from the optical sheet, collimated and polarized light, change the light to light polarized in the first direction, collimates the light in the direction normal to the optical sheet and emits the light.

14. A lighting apparatus comprising:

an optical sheet having an isotropic medium layer which is made of an optically isotropic medium and which has a first surface and a plurality of ridge-shaped projections formed on the first surface, each of the projections having a substantially triangular cross section; and an anisotropic medium layer which is made of an optically uniaxial medium and which has a second surface and a plurality of groove-shaped recesses made in the second surface, each of the recesses having a substantially triangular cross section, the projections and the recesses being arranged in a first direction and extending in a second direction, the first and second directions being in planes of the isotropic and anisotropic medium layers and intersecting with each other at right angles, the cross section of each of the projections having a substantially right-angled apex defined by two sides which have substantially the same length and which extend from the first surface, and the cross section of each of the recesses having a substantially right-angled apex defined by two sides which have substantially the same length and which recede from the second surface, and the isotropic medium layer and the anisotropic medium layer being laid one on the other, with the respective projections firmly fitted in the respective recesses;

a liquid crystal element which faces the optical sheet and which is located at the isotropic medium layer;

a backlight unit which faces the liquid crystal element; and a polarizer which is interposed between the liquid crystal element and the backlight unit, the backlight unit being configured to emit diffused light, the polarizer having a transmission axis that is parallel to the first direction, the liquid crystal element being configured to receive light polarized in the first direction and emits the light as light polarized in the first direction or the second direction, and the optical sheet being configured to receive, from the liquid crystal element, light polarized in the first direction, maintain the light polarized in the first direction, diffuse the light and emit the light diffused, and to receive, from the liquid crystal element, light polarized in the second direction, maintain the light polarized in the second direction, collimate the light in a direction normal to the optical sheet and emit the light.

15. A lighting apparatus comprising:

an optical sheet having an isotropic medium layer which is made of an optically isotropic medium and which has a first surface and a plurality of ridge-shaped projections formed on the first surface, each of the projections having a substantially triangular cross section; and an anisotropic medium layer which is made of an optically uniaxial medium and which has a second surface and a plurality of groove-shaped recesses made in the second surface, each of the recesses having a substantially triangular cross section, the projections and the recesses being arranged in a first direction and extending in a second direction, the first and second directions being in planes of the isotropic and anisotropic medium layers and intersecting with each other at right angles, the cross section of each of the projections having a substantially right-angled apex defined by two sides which have substantially the same length and which extend from the first surface, and the cross section of each of the recesses having a substantially right-angled apex defined by two sides which have substantially the same length and which recede from the second surface, and the isotropic medium layer and the anisotropic medium layer being laid one on the other, with the respective projections firmly fitted in the respective recesses;

a pair of liquid crystal elements provide on sides of the optical sheet, respectively;

a backlight unit which faces the liquid crystal element located at the isotropic medium layer; and a polarizer which is interposed between the liquid crystal element located at the isotropic medium layer and the backlight unit, the backlight unit being configured to emit diffused light, the polarizer having a transmission axis that is parallel to the first direction, the liquid crystal element located at the isotropic medium layer being configured to receive light polarized in the first direction and emits the light as light polarized in the first direction or the second direction, the optical sheet being configured to receive, from the liquid crystal element located at the isotropic medium layer, light polarized in the first direction, maintain the light polarized in the first direction, diffuse the light and emit the light diffused, and to receive, from the liquid crystal element located at the isotropic medium layer, light polarized in the second direction, maintain the light polarized in the second direction, collimate the light in a direction normal to the optical sheet and emit the light, and the liquid crystal element located at the anisotropic medium layer being configured to receive, from the optical sheet, light polarized in the first direction, maintain the light polarized in the first direction, diffuse the light and emits the light, and to receive, from the optical sheet, collimated and polarized light, change the light to light polarized in the first direction, collimates the light in the direction normal to the optical sheet and emits the light.

16. A lighting apparatus comprising:

an optical sheet having an isotropic medium layer which is made of an optically isotropic medium and which has a first surface and a plurality of ridge-shaped projections formed on the first surface, each of the projections having a substantially triangular cross section; and an anisotropic medium layer which is made of an optically uniaxial medium and which has a second surface and a plurality of groove-shaped recesses made in the second surface, each of the recesses having a substantially triangular cross section, the projections and the recesses being arranged in a first direction and extending in a second direction, the first and second directions being in planes of the isotropic and anisotropic medium layers and intersecting with each other at right angles, the cross section of each of the projections having a substantially right-angled apex defined by two sides which have substantially the same length and which extend from the first surface, and the cross section of each of the recesses having a substantially right-angled apex defined by two sides which have substantially the same length and which recede from the second surface, and the isotropic medium layer and the anisotropic medium layer being laid one on the other, with the respective projections firmly fitted in the respective recesses;

a liquid crystal element which faces the optical sheet and which is located at the anisotropic medium layer;

a backlight unit which faces the liquid crystal element; and a polarizer which is interposed between the liquid crystal element and the backlight unit, the backlight unit being configured to emit diffused light, and the polarizer having a transmission axis that is parallel to the first direction, the liquid crystal element being configured to receive light polarized in the first direction and emits the light as light polarized in the first direction or the second direction, and the optical sheet being configured to receive, from the liquid crystal element, light polarized in the first direction, maintain the light polarized in the first direction, diffuse the light and emit the light diffused, and to receive, from the liquid crystal element, light polarized in the second direction, maintain the light polarized in the second direction, collimate the light in a direction normal to the optical sheet and emit the light.

17. A lighting apparatus comprising:

an optical sheet having an isotropic medium layer which is made of an optically isotropic medium and which has a first surface and a plurality of ridge-shaped projections formed on the first surface, each of the projections having a substantially triangular cross section; and an anisotropic medium layer which is made of an optically uniaxial medium and which has a second surface and a plurality of groove-shaped recesses made in the second surface, each of the recesses having a substantially triangular cross section, the projections and the recesses being arranged in a first direction and extending in a second direction, the first and second directions being in planes of the isotropic and anisotropic medium layers and intersecting with each other at right angles, the cross section of each of the projections having a substantially right-angled apex defined by two sides which have substantially the same length and which extend from the first surface, and the cross section of each of the recesses having a substantially right-angled apex defined by two sides which have substantially the same length and which recede from the second surface, and the isotropic medium layer and the anisotropic medium layer being laid one on the other, with the respective projections firmly fitted in the respective recesses;

a pair of liquid crystal elements provide on sides of the optical sheet, respectively;

a backlight unit which faces the liquid crystal element located at the anisotropic medium layer; and a polarizer which is interposed between the liquid crystal element located at the anisotropic medium layer and the backlight unit, the backlight unit being configured to emit diffused light, the polarizer having a transmission axis that is parallel to the first direction, the liquid crystal element located at the anisotropic medium layer being configured to receive light polarized in the first direction and emits the light as light polarized in the first direction or the second direction, the optical sheet being configured to receive, from the liquid crystal element located at the anisotropic medium layer, light polarized in the first direction, maintain the light polarized in the first direction, diffuse the light and emit the light diffused, and to receive, from the liquid crystal element located at the anisotropic medium layer, light polarized in the second direction, maintain the light polarized in the second direction, collimate the light in a direction normal to the optical sheet and emit the light, and the liquid crystal element located at the isotropic medium layer being configured to receive, from the optical sheet, light polarized in the first direction, maintain the light polarized in the first direction, diffuse the light and emits the light, and to receive collimated and polarized light from the optical sheet, change the light to light polarized in the first direction, collimates the light in the direction normal to the optical sheet and emits the light.

18. A liquid crystal display comprising:

a lighting apparatus which includes an optical sheet, a liquid crystal element and a back light unit, the optical sheet having an isotropic medium layer and an anisotropic medium layer, the isotropic medium layer being made of an optically isotropic medium and having a first surface, a plurality of ridge-shaped projections which are formed on the first surface, which are arranged in a first direction and which extend in a second direction intersecting at right angles to the first direction, each of the projections having a cross section shaped like a segment of a circle, the anisotropic medium layer being made of an optically uniaxial medium and having a second surface, and a plurality of groove-shaped recesses which are made in the second surface, which are arranged in the first direction and extend in the second direction, each of the recesses having a cross section shaped like a segment of a circle, and the isotropic medium layer and the anisotropic medium layer being laid one on the other, with the respective projections firmly fitted in the respective recesses; the liquid crystal element facing the optical sheet and located at the isotropic medium layer; and the backlight unit facing the liquid crystal element;

a liquid crystal display panel which includes an array substrate, a counter substrate arranged opposite to the array substrate with a gap therebetween, and a liquid crystal layer interposed between the array substrate and the counter substrate; and a polarizer which is interposed between the liquid crystal element and the backlight unit, the array substrate and the optical sheet being opposed to each other, the polarizer having a transmission axis that is parallel to the first direction, the liquid crystal element being configured to receive light polarized in the first direction and emits the light as light polarized in the first direction or the second direction, and the optical sheet being configured to receive, from the liquid crystal element, light polarized in the first direction, maintain the light polarized in the first direction, diffuse the light and emit the light diffused, and to receive, from the liquid crystal element, light polarized in the second direction, maintain the light polarized in the second direction, collimate the light in a direction normal to the optical sheet and emit the light.

19. A liquid crystal display comprising:

a lighting apparatus which includes an optical sheet, a pair of liquid crystal elements and a back light unit, the optical sheet having an isotropic medium layer and an anisotropic medium layer, the isotropic medium layer being made of an optically isotropic medium and having a first surface, a plurality of ridge-shaped projections which are formed on the first surface, which are arranged in a first direction and which extend in a second direction intersecting at right angles to the first direction, each of the projections having a cross section shaped like a segment of a circle, the anisotropic medium layer being made of an optically uniaxial medium and having a second surface, and a plurality of groove-shaped recesses which are made in the second surface, which are arranged in the first direction and which extend in the second direction, each of the recesses having a cross section shaped like a segment of a circle, and the isotropic medium layer and the anisotropic medium layer being laid one on the other, with the respective projections firmly fitted in the respective recesses; the liquid crystal elements being provided on sides of the optical sheet, respectively; and the backlight unit facing the liquid crystal element located at the isotropic medium layer;

a liquid crystal display panel which includes an array substrate, a counter substrate arranged opposite to the array substrate with a gap therebetween, and a liquid crystal layer interposed between the array substrate and the counter substrate;

a first polarizer which is interposed between the liquid crystal element located at the isotropic medium layer and the backlight unit;

a second polarizer provided on an outer surface of the counter substrate; and a third polarizer which is interposed between the liquid crystal element located at the anisotropic medium layer and the array substrate, the array substrate and the liquid crystal display located at the anisotropic medium layer being opposed to each other, the first, second and third polarizers having transmission axes that are parallel to the first direction, the liquid crystal element located at the isotropic medium layer being configured to receive light polarized in the first direction and emits the light as light polarized in the first direction or the second direction, the optical sheet being configured to receive, from the liquid crystal element located at the isotropic medium layer, light polarized in the first direction, maintain the light polarized in the first direction, diffuse the light and emit the light diffused, and to receive, from the liquid crystal element located at the isotropic medium layer, light polarized in the second direction, maintain the light polarized in the second direction, collimate the light in a direction normal to the optical sheet and emit the light, and the liquid crystal element located at the anisotropic medium layer being configured to receive, from the optical sheet, light polarized in the first direction, maintain the light polarized in the first direction, diffuse the light and emits the light, and to receive collimated and polarized light from the optical sheet, change the light to light polarized in the first direction, collimates the light in the direction normal to the optical sheet and emits the light.

20. A liquid crystal display comprising:

a lighting apparatus which includes an optical sheet, a liquid crystal element and a back light unit, the optical sheet having an isotropic medium layer and an anisotropic medium layer, the isotropic medium layer being made of an optically isotropic medium and having a first surface, a plurality of ridge-shaped projections which are formed on the first surface, which are arranged in a first direction and which extend in a second direction intersecting at right angles to the first direction, each of the projections having a cross section shaped like a segment of a circle, the anisotropic medium layer being made of an optically uniaxial medium and having a second surface, and a plurality of groove-shaped recesses which are made in the second surface, which are arranged in the first direction and extend in the second direction, each of the recesses having a cross section shaped like a segment of a circle, and the isotropic medium layer and the anisotropic medium layer being laid one on the other, with the respective projections firmly fitted in the respective recesses; the liquid crystal element facing the optical sheet and located at the isotropic medium layer; and the backlight unit facing the liquid crystal element;

a liquid crystal display panel which includes an array substrate, a counter substrate arranged opposite to the array substrate with a gap therebetween, and a liquid crystal layer interposed between the array substrate and the counter substrate;

a polarizer which is interposed between the liquid crystal element and the backlight unit; and another polarizer provided on an outer surface of the counter substrate;

the array substrate and the optical sheet being opposed to each other, the polarizer and the another polarizer having transmission axes that are parallel to the first direction, the liquid crystal element being configured to receive light polarized in the first direction and emits the light as light polarized in the first direction or the second direction, and the optical sheet being configured to receive, from the liquid crystal element, light polarized in the first direction, maintain the light polarized in the first direction, diffuse the light and emit the light diffused, and to receive, from the liquid crystal element, light polarized in the second direction, maintain the light polarized in the second direction, collimate the light in a direction normal to the optical sheet and emit the light.

21. A liquid crystal display comprising:

a lighting apparatus which includes an optical sheet, a pair of liquid crystal elements and a back light unit, the optical sheet having an isotropic medium layer and an anisotropic medium layer, the isotropic medium layer being made of an optically isotropic medium and having a first surface, a plurality of ridge-shaped projections which are formed on the first surface, which are arranged in a first direction and which extend in a second direction intersecting at right angles to the first direction, each of the projections having a cross section shaped like a segment of a circle, the anisotropic medium layer being made of an optically uniaxial medium and having a second surface, and a plurality of groove-shaped recesses which are made in the second surface, which are arranged in the first direction and which extend in the second direction, each of the recesses having a cross section shaped like a segment of a circle, and the isotropic medium layer and the anisotropic medium layer being laid one on the other, with the respective projections firmly fitted in the respective recesses; the liquid crystal elements being provided on sides of the optical sheet, respectively; and the backlight unit facing the liquid crystal element located at the isotropic medium layer;

a liquid crystal display panel which includes an array substrate, a counter substrate arranged opposite to the array substrate with a gap therebetween, and a liquid crystal layer interposed between the array substrate and the counter substrate;

a polarizer which is interposed between the liquid crystal element located at the isotropic medium layer and the backlight unit; and another polarizer provided on an outer surface of the counter substrate;

the array substrate and the optical sheet located at the anisotropic medium layer being opposed to each other, the polarizer and the another polarizer having transmission axes that are parallel to the first direction, the liquid crystal element located at the isotropic medium layer being configured to receive light polarized in the first direction and emits the light as light polarized in the first direction or the second direction, the optical sheet being configured to receive, from the liquid crystal element located at the isotropic medium layer, light polarized in the first direction, maintain the light polarized in the first direction, diffuse the light and emit the light diffused, and to receive, from the liquid crystal element located at the isotropic medium layer, light polarized in the second direction, maintain the light polarized in the second direction, collimate the light in a direction normal to the optical sheet and emit the light, and the liquid crystal element located at the anisotropic medium layer being configured to receive, from the optical sheet, light polarized in the first direction, maintain the light polarized in the first direction, diffuse the light and emits the light, and to receive, from the optical sheet, collimated and polarized light from, change the light to light polarized in the first direction, collimates the light in the direction normal to the optical sheet and emits the light.

22. A liquid crystal display comprising:

a lighting apparatus which includes an optical sheet, a liquid crystal element and a back light unit, the optical sheet having an isotropic medium layer which is made of an optically isotropic medium and which has a first surface and a plurality of ridge-shaped projections formed on the first surface, arranged in a first direction and extending in a second direction, each of the projections having a substantially triangular cross section, and an anisotropic medium layer which is made of an optically uniaxial medium and which has a second surface, a plurality of groove-shaped recesses made in the second surface, arranged in the first direction and extending in the second direction, each of the recesses having a substantially triangular cross section, the first and second directions being in planes of the isotropic and anisotropic medium layers and intersecting with each other at right angles, the cross section of each of the projections having a substantially right-angled apex defined by two sides which have substantially the same length and which extend from the first surface, and the cross section of each of the recesses having a substantially right-angled apex defined by two sides which have substantially the same length and which recede from the second surface, and the isotropic medium layer and the anisotropic medium layer being laid one on the other, with the respective projections firmly fitted in the respective recesses; the liquid crystal element facing the optical sheet and located at the isotropic medium layer; and the backlight unit facing the liquid crystal element;

a liquid crystal display panel which includes an array substrate, a counter substrate arranged opposite to the array substrate with a gap therebetween, and a liquid crystal layer interposed between the array substrate and the counter substrate;

a polarizer which is interposed between the liquid crystal element and the backlight unit; and another polarizer provided on an outer surface of the counter substrate;

the array substrate and the optical sheet being opposed to each other, the polarizer and the another polarizer having transmission axes that are parallel to the first direction, the liquid crystal element being configured to receive light polarized in the first direction and emits the light as light polarized in the first direction or the second direction, and the optical sheet being configured to receive, from the liquid crystal element, light polarized in the first direction, maintain the light polarized in the first direction, diffuse the light and emit the light diffused, and to receive, from the liquid crystal element, light polarized in the second direction, maintain the light polarized in the second direction, collimate the light in a direction normal to the optical sheet and emit the light.

23. A liquid crystal display comprising:

a lighting apparatus which includes an optical sheet, a liquid crystal element and a back light unit, the optical sheet having an isotropic medium layer which is made of an optically isotropic medium and which has a first surface and a plurality of ridge-shaped projections formed on the first surface, each of the projections having a substantially triangular cross section; and an anisotropic medium layer which is made of an optically uniaxial medium and which has a second surface and a plurality of groove-shaped recesses made in the second surface, each of the recesses having a substantially triangular cross section, the projections and recesses being arranged in a first direction and extending in a second direction, the first and second directions being in planes of the isotropic and anisotropic medium layers and intersecting with each other at right angles, the cross section of each of the projections having a substantially right-angled apex defined by two sides which have substantially the same length and which extend from the first surface, the cross section of each of the recesses having a substantially right-angled apex defined by two sides which have substantially the same length and which recede from the second surface, and the isotropic medium layer and the anisotropic medium layer being laid one on the other, with the respective projections firmly fitted in the respective recesses; the liquid crystal element facing the optical sheet and located at the anisotropic medium layer; and the backlight unit facing the liquid crystal element;

a liquid crystal display panel which includes an array substrate, a counter substrate arranged opposite to the array substrate with a gap therebetween, and a liquid crystal layer interposed between the array substrate and the counter substrate;

a polarizer which is interposed between the liquid crystal element and the backlight unit; and another polarizer provided on an outer surface of the counter substrate;

the array substrate and the optical sheet being opposed to each other, the polarizer and the another polarizer having transmission axes that are parallel to the first direction, the liquid crystal element being configured to receive light polarized in the first direction and emits the light as light polarized in the first direction or the second direction, and the optical sheet being configured to receive, from the liquid crystal element, light polarized in the first direction, maintain the light polarized in the first direction, diffuse the light and emit the light diffused, and to receive, from the liquid crystal element, light polarized in the second direction, maintain the light polarized in the second direction, collimate the light in a direction normal to the optical sheet and emit the light.

24. A liquid crystal display comprising:

a lighting apparatus which includes an optical sheet, a pair of liquid crystal elements and a back light unit, the optical sheet having an isotropic medium layer which is made of an optically isotropic medium and which has a first surface and a plurality of ridge-shaped projections formed on the first surface, each of the projections having a substantially triangular cross section; and an anisotropic medium layer which is made of an optically uniaxial medium and which has a second surface and a plurality of groove-shaped recesses made in the second surface, each of the recesses having a substantially triangular cross section, the projections and the recesses being arranged in a first direction and extending in a second direction, the first and second directions being in planes of the isotropic and anisotropic medium layers and intersecting with each other at right angles, the cross section of each of the projections having a substantially right-angled apex defined by two sides which have substantially the same length and which extend from the first surface, and the cross section of each of the recesses having a substantially right-angled apex defined by two sides which have substantially the same length and which recede from the second surface, and the isotropic medium layer and the anisotropic medium layer being laid one on the other, with the respective projections firmly fitted in the respective recesses; the liquid crystal elements being provided on sides of the optical sheet, respectively; and the backlight unit facing the liquid crystal element located at the isotropic medium layer;

a liquid crystal display panel which includes an array substrate, a counter substrate arranged opposite to the array substrate with a gap therebetween, and a liquid crystal layer interposed between the array substrate and the counter substrate;

a first polarizer which is interposed between the liquid crystal element located at the isotropic medium layer and the backlight unit;

a second polarizer which provided on an outer surface of the counter substrate; and a third polarizer which is interposed between the liquid crystal element located at the anisotropic medium layer and the array substrate, the array substrate and the liquid crystal element located at the anisotropic medium layer being opposed to each other, the first, second and third polarizers having transmission axes that are parallel to the first direction, the liquid crystal element located at the isotropic medium layer being configured to receive light polarized in the first direction and emits the light as light polarized in the first direction or the second direction, the optical sheet being configured to receive, from the liquid crystal element located at the isotropic medium layer, light polarized in the first direction, maintain the light polarized in the first direction, diffuse the light and emit the light diffused, and to receive, from the liquid crystal element located at the isotropic medium layer, light polarized in the second direction, maintain the light polarized in the second direction, collimate the light in a direction normal to the optical sheet and emit the light, and the liquid crystal element located at the anisotropic medium layer being configured to receive, from the optical sheet, light polarized in the first direction, maintain the light in the first direction, diffuse the light and emits the light, and to receive collimated and polarized light from the optical sheet, change the light to light polarized in the first direction, collimates the light in the direction normal to the optical sheet and emits the light.

25. A liquid crystal display comprising:

a lighting apparatus which includes an optical sheet, a pair of liquid crystal elements and a back light unit, the optical sheet having an isotropic medium layer which is made of an optically isotropic medium and which has a first surface and a plurality of ridge-shaped projections formed on the first surface, each of the projections having a substantially triangular cross section; and an anisotropic medium layer which is made of an optically uniaxial medium and which has a second surface and a plurality of groove-shaped recesses made in the second surface, each of the recesses having a substantially triangular cross section, the projections and the recesses being arranged in a first direction and extending in a second direction, the first and second directions being in planes of the isotropic and anisotropic medium layers and intersecting with each other at right angles, the cross section of each of the projections having a substantially right-angled apex defined by two sides which have substantially the same length and which extend from the first surface, and the cross section of each of the recesses having a substantially right-angled apex defined by two sides which have substantially the same length and which recede from the second surface, and the isotropic medium layer and the anisotropic medium layer being laid one on the other, with the respective projections firmly fitted in the respective recesses; the liquid crystal elements being provided on sides of the optical sheet, respectively; and the backlight unit facing the liquid crystal element located at the anisotropic medium layer;

a liquid crystal display panel which includes an array substrate, a counter substrate arranged opposite to the array substrate with a gap therebetween, and a liquid crystal layer interposed between the array substrate and the counter substrate;

a first polarizer which is interposed between the liquid crystal element located at the anisotropic medium layer and the backlight unit;

a second polarizer which provided on an outer surface of the counter substrate; and a third polarizer which is interposed between the liquid crystal element located at the isotropic medium layer and the array substrate, the array substrate and the liquid crystal element located at the isotropic medium layer being opposed to each other, the first, second and third polarizers having transmission axes that are parallel to the first direction, the liquid crystal element located at the anisotropic medium layer being configured to receive light polarized in the first direction and emits the light as light polarized in the first direction or the second direction, the optical sheet being configured to receive, from the liquid crystal element located at the anisotropic medium layer, light polarized in the first direction, maintain the light polarized in the first direction, diffuse the light and emit the light diffused, and to receive, from the liquid crystal element located at the anisotropic medium layer, light polarized in the second direction, maintain the light polarized in the second direction, collimate the light in a direction normal to the optical sheet and emit the light, and the liquid crystal element located at the isotropic medium layer being configured to receive, from the optical sheet, light polarized in the first direction, maintain the light in the first direction, diffuse the light and emits the light, and to receive collimated and polarized light from the optical sheet, change the light to light polarized in the first direction, collimates the light in the direction normal to the optical sheet and emits the light.

26. A method of manufacturing an optical sheet, comprising:

preparing an isotropic medium layer having a first surface and a plurality of ridge-shaped projections made on the first surface, arranged in a first direction and extending in a second direction intersecting with the first direction at right angles, each of the projections having a cross section shaped like a segment of a circle;

dripping, coating or applying nematic liquid crystal polymer to the first surface of the isotropic medium layer prepared; and laying, on the first surface of the isotropic medium layer, an anisotropic medium layer having a second surface and a plurality of groove-shaped recesses made in the second surface, arranged in the first direction and extending in the second direction, with the respective projections firmly fitted in the respective recesses, each of the recesses having a cross section shaped like a segment of a circle.

27. A method of manufacturing an optical sheet, comprising:

preparing an isotropic medium layer having a first surface and a plurality of ridge-shaped projections made on the first surface, arranged in a first direction and extending in a second direction intersecting with the first direction at right angles, each of the projections having a cross section shaped like a segment of a circle;

dripping, coating or applying nematic liquid crystal to the first surface of the isotropic medium layer prepared; and laying, on the first surface of the isotropic medium layer, an anisotropic medium layer having a second surface and a plurality of groove-shaped recesses made in the second surface, arranged in the first direction and extending in the second direction, with the respective projections firmly fitted in the respective recesses, each of the recesses having a cross section shaped like a segment of a circle.

28. A method of manufacturing an optical sheet, comprising:

preparing an isotropic medium layer having a first surface and a plurality of ridge-shaped projections made on the first surface, arranged in a first direction and extending in a second direction intersecting with the first direction at right angles, each of the projections having a cross section shaped like a segment of a circle;

dripping, coating or applying nematic liquid crystal to the first surface of the isotropic medium layer prepared; and applying ultraviolet rays to the nematic liquid crystal dripped, coated or applied, thereby polymerizing the nematic liquid crystal;

laying, on the first surface of the isotropic medium layer, an anisotropic medium layer having a second surface and a plurality of groove-shaped recesses made in the second surface, arranged in the first direction and extending in the second direction, with the respective projections firmly fitted in the respective recesses, each of the recesses having a cross section shaped like a segment of a circle.

29. A method of manufacturing an optical sheet, comprising:

preparing an isotropic medium layer having a first surface and a plurality of ridge-shaped projections made on the first surface, arranged in a first direction and extending in a second direction intersecting with the first direction at right angles, each of the projections having a substantially triangular cross section, the cross section of each of the projections having a substantially right-angled apex defined by two sides which have substantially the same length and which extend from the first surface;

dripping, coating or applying nematic liquid crystal polymer to the first surface of the isotropic medium layer prepared; and laying, on the first surface of the isotropic medium layer, an anisotropic medium layer having a second surface and a plurality of groove-shaped recesses made in the second surface, arranged in the first direction and extending in the second direction, with the respective projections firmly fitted in the respective recesses, each of the recesses having a substantially triangular cross section, the cross section of each of the recesses having a substantially right-angled apex defined by two sides which have substantially the same length and which recede from the second surface.

30. A method of manufacturing an optical sheet, comprising:

preparing an isotropic medium layer having a first surface and a plurality of ridge-shaped projections made on the first surface, arranged in a first direction and extending in a second direction intersecting with the first direction at right angles, each of the projections having a substantially triangular cross section, the cross section of each of the projections having a substantially right-angled apex defined by two sides which have substantially the same length and which extend from the first surface;

dripping, coating or applying nematic liquid crystal to the first surface of the isotropic medium layer prepared; and laying, on the first surface of the isotropic medium layer, an anisotropic medium layer having a second surface and a plurality of groove-shaped recesses made in the second surface, arranged in the first direction and extending in the second direction, with the respective projections firmly fitted in the respective recesses, each of the recesses having a substantially triangular cross section, the cross section of each of the recesses having a substantially right-angled apex defined by two sides which have substantially the same length and which recede from the second surface.

31. A method of manufacturing an optical sheet, comprising:

preparing an isotropic medium layer having a first surface and a plurality of ridge-shaped projections made on the first surface, arranged in a first direction and extending in a second direction intersecting with the first direction at right angles, each of the projections having a substantially triangular cross section, the cross section of each of the projections having a substantially right-angled apex defined by two sides which have substantially the same length and which extend from the first surface;

dripping, coating or applying nematic liquid crystal to the first surface of the isotropic medium layer prepared; and applying ultraviolet rays to the nematic liquid crystal dripped, coated or applied, thereby polymerizing the nematic liquid crystal;

laying, on the first surface of the isotropic medium layer, an anisotropic medium layer having a second surface and a plurality of groove-shaped recesses made in the second surface, arranged in the first direction and extending in the second direction, with the respective projections firmly fitted in the respective recesses, each of the recesses having a substantially triangular cross section, the cross section of each of the recesses having a substantially right-angled apex defined by two sides which have substantially the same length and which recede from the second surface.

* * * * *